US007890809B2

(12) United States Patent
Nye et al.

(10) Patent No.: US 7,890,809 B2
(45) Date of Patent: Feb. 15, 2011

(54) HIGH LEVEL OPERATIONAL SUPPORT SYSTEM

(75) Inventors: Blaine Nye, Crofton, MD (US); David Sze Hong, Gaithersburg, MD (US)

(73) Assignee: TeleCommunication Systems, Inc., Annapolis, MD (US)

( * ) Notice: Subject to any disclaimer, the term of this patent is extended or adjusted under 35 U.S.C. 154(b) by 112 days.

(21) Appl. No.: 12/385,190

(22) Filed: Apr. 1, 2009

(65) Prior Publication Data

US 2009/0193418 A1 Jul. 30, 2009

Related U.S. Application Data

(63) Continuation of application No. 11/984,640, filed on Nov. 20, 2007, now Pat. No. 7,533,301, which is a continuation of application No. 10/426,640, filed on May 1, 2003, now Pat. No. 7,302,612.

(51) Int. Cl.
*G06F 11/00* (2006.01)
(52) U.S. Cl. .............................. 714/38; 714/47; 719/320
(58) Field of Classification Search ................... 714/25, 714/35, 38, 47; 719/320; 709/224
See application file for complete search history.

(56) References Cited

U.S. PATENT DOCUMENTS 6,336,118 B1 * 1/2002 Hammond ......................... 1/1

| | | | |
|---|---|---|---|
| 6,748,555 B1 * | 6/2004 | Teegan et al. .................. | 714/38 |
| 6,862,698 B1 * | 3/2005 | Shyu ............................. | 714/57 |
| 7,003,560 B1 * | 2/2006 | Mullen et al. ................. | 709/223 |
| 7,100,195 B1 * | 8/2006 | Underwood .................... | 726/2 |
| 2003/0037288 A1 * | 2/2003 | Harper et al. .................. | 714/37 |
| 2003/0204791 A1 * | 10/2003 | Helgren et al. ................. | 714/48 |
| 2004/0073566 A1 * | 4/2004 | Trivedi ........................ | 707/102 |
| 2004/0088401 A1 * | 5/2004 | Tripathi et al. ............... | 709/224 |
| 2005/0044535 A1 * | 2/2005 | Coppert ....................... | 717/127 |
| 2005/0166099 A1 * | 7/2005 | Shyu ............................. | 714/47 |

\* cited by examiner

*Primary Examiner*—Joshua A Lohn
(74) *Attorney, Agent, or Firm*—William H. Bollman

(57) ABSTRACT

A high level Operational Support System (OSS) framework provides the infrastructure and analytical system to enable all applications and systems to be managed dynamically at runtime regardless of platform or programming technology. Applications are automatically discovered and managed. Java applications have the additional advantage of auto-inspection (through reflection) to determine their manageability. Resources belonging to application instances are associated and managed with that application instance. This provides operators the ability to not only manage an application, but its distributed components as well. They are presented as belonging to a single application instance node that can be monitored, analyzed, and managed. The OSS framework provides the platform-independent infrastructure that heterogeneous applications require to be monitored, controlled, analyzed and managed at runtime. New and legacy applications written in C++ or Java are viewed and manipulated identically with zero coupling between the applications themselves and the tools that scrutinize them.

9 Claims, 18 Drawing Sheets

System Model / Context Diagram

System Model / Context Diagram

*Figure 6 Class Diagram - Master Steward*

Figure 7 Class Diagram - Application Steward

*Figure 5 Class Diagram - Statistics Manager*

Figure 4 Class Diagram - Control Center

Figure 8 Sequence Diagram - Health Manager

Figure 9 Sequence Diagram - Statistics Manager

*Figure 10 Sequence Diagram - Overall Health*

HIGH LEVEL OPERATIONAL SUPPORT SYSTEM

The present application is a continuation of U.S. patent application Ser. No. 11/984,640, entitled "HIGH LEVEL OPERATIONAL SUPPORT SYSTEM," filed on Nov. 20, 2007 now U.S. Pat. No. 7,533,301; which is continuation of U.S. patent application Ser. No. 10/426,640, entitled "HIGH LEVEL OPERATIONAL SUPPORT SYSTEM," filed on May 1, 2003, which is now U.S. Pat. No. 7,302,612, the entirety of both of which are explicitly incorporated herein by reference.

BACKGROUND OF THE INVENTION

1. Field of the Invention

This invention relates generally to wireless communication carriers. More particularly, it relates to operational support system (OSS), application/systems management, and network management.

2. Background of Related Art

Many network management technologies exist that allow operators to manage applications and devices at runtime. For instance, SNMP, TL1 and JMX each attempt to provide operators with the ability to manipulate and affect change at runtime. The fundamental of each is similar. It is to manipulate the objects of an application through messaging.

SNMP is the standard basic management service for networks that operate in TCP/IP environments. It is intended primarily to operate well-defined devices easily and does so quite successfully. However, it is limited to the querying and updating of variables. Transaction Language 1 (TL1) is a set of ASCII-based instructions, or "messages," that an operations support system (OSS) uses to manage a network element (NE) and its resources. JMX is a Java centric technology that permits the total management of objects: not only the manipulation of fields, but also the execution of object operations. It is designed to take advantage of the Java language to allow for the discovery and manipulation of new or legacy applications or devices.

Operational Support for enterprise applications is currently realized using a variety of technologies and distinct, separate services. For instance, network management protocols (SNMP, JMX, TL1, etc.) provide runtime configuration and some provide operation invocation, but these technologies are not necessarily geared toward applications. Some are language specific (e.g., JMX) and require language agnostic bridging mechanisms that must be implemented, configured and maintained. SNMP is generic (e.g., TL1 and SNMP) and very simple in nature, but it requires application developers to implement solutions to common OSS tasks on top of SNMP. TL1 is also ASCII based and generic. However, while it is very flexible and powerful, it is another language that must be mastered, and it's nature is command line based. As a result, it is not intuitively based in presentation layer tools. While all the technologies have their respective benefits, they do not provide direct means of providing higher level OSS functionality. Conventionally, applications are monitored, analyzed and managed at runtime.

SUMMARY OF THE INVENTION

In accordance with the principles of the present invention, a method and apparatus for providing a high level operational support system framework comprises monitoring a health of a plurality of applications. The health of the plurality of applications is assessed, and the health of the plurality of applications is analyzed, whereby each of the plurality of applications are managed dynamically at runtime regardless of a platform of each of the plurality of applications.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

Conventional SNMP, TL1 and/or JMX management solutions do not provide a framework to assess, analyze and monitor the health of an application and its subsystems. As a result, a great deal of application tuning and external maintenance is required.

Conventionally, each application gathers, stores, analyzes and displays its information individually and uniquely. This disparity makes central management of these complex applications difficult. By providing a consolidated approach to OSS, an operator can manage an entire deployment of different products from a single node. Fault management, statistics management, and system health monitoring can be processed in a consistent fashion and presented effectively.

A high level Operational Support System (OSS) framework in accordance with the principles of the present invention provides the infrastructure and analytical system to enable all applications and systems to be managed dynamically at runtime regardless of platform or programming technology (C++ or Java). Applications that comply with the framework are automatically discovered and managed. Java applications have the additional advantage of auto-inspection (through reflection) to determine their manageability. Resources belonging to application instances are associated and managed with that application instance. This provides operators the ability to not only manage an application, but its distributed components as well. They are presented as belonging to a single application instance node that can be monitored, analyzed, and managed.

The Operation Support System (OSS) framework provides the platform-independent infrastructure that heterogeneous applications require to be monitored, controlled, analyzed and managed at runtime. New and legacy applications written in C++ or Java are viewed and manipulated identically with zero coupling between the applications themselves and the tools that scrutinize them.

An application addresses a business problem. It provides an elegant solution to a complex problem. Monitoring, analyzing, controlling and managing such an application to ensure it is addressing its problem does not require the development of another solution almost as extensive as the original application, as in conventional systems. Applications wanting this type of OSS functionality either have to develop the infrastructure themselves or cobble together functionality using existing, sometimes complicated technologies. The OSS framework provides developers of new and existing legacy applications the ability to easily specify how they want their application represented, monitored, and controlled without having to carve up their existing code base.

Figure 1:
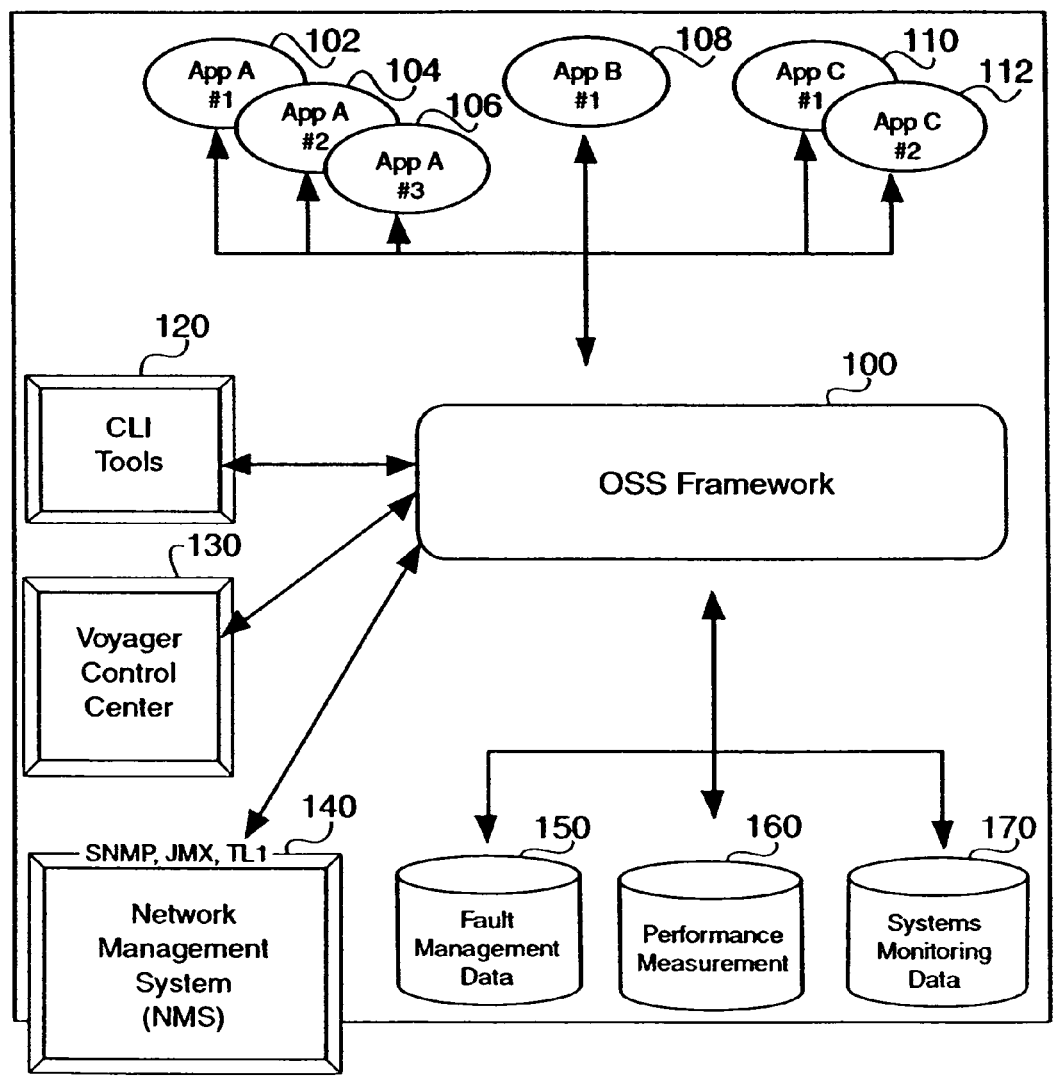
FIG. 1 shows a system model/context diagram of a high level operational support system (OSS), in accordance with an exemplary embodiment of the present invention.

FIG. 1 shows a system model/context diagram of a high level operational support system (OSS), in accordance with an exemplary embodiment of the present invention.

In particular, as shown in FIG. 1, a high level operational support system (OSS) framework 100 overseeing a plurality of applications 102-112, and providing high level management of the plurality of applications 102-112 dynamically at runtime regardless of the platform or programming technology utilized by any particular application 102-112.

The OSS framework 100 communicates with user interfaces (UI), such as command line interface (CLI) tools, a control center 130, and a network management system (NMS) 140. The OSS framework 100 also allows for the storage of fault management data 150, performance measurement data 160, and systems monitoring data 170, which is preferably optionally provided.

The disclosed embodiment was developed under a RogueWave Tools h++ library, and support both C++ and JAVA development. However, it is preferred that the OSS framework 100 not be platform specific, and also that it be independent of the presentation layer (UI). Preferably, the OSS framework 100 does not adversely affect core messaging performance.

All managed components managed by the network management system (NMS) 140 support the desired network management protocols (e.g., SNMP, JMX, TL1) regardless of implementation language (e.g., C++ or JAVA).

Business logic of the OSS framework 100 is preferably independent from the particular user interface used. The persistent storage mechanisms 150, 160, 170 preferably support RDBMS, flat files, or an XML document.

Preferably, system monitoring modules are able to access resources of the operating system. Service modules are also preferably able to access persistent data storage such as files and remote RDBMS. OSS messages can be XML-encoded in compliance with DTDs of the OSS. OSS messages can be encapsulated in specialized Usher classes, which are an abstraction of XMF. OSS messages can also be encapsulated in an XML facilitation class (e.g., DOM).

Figure 2:
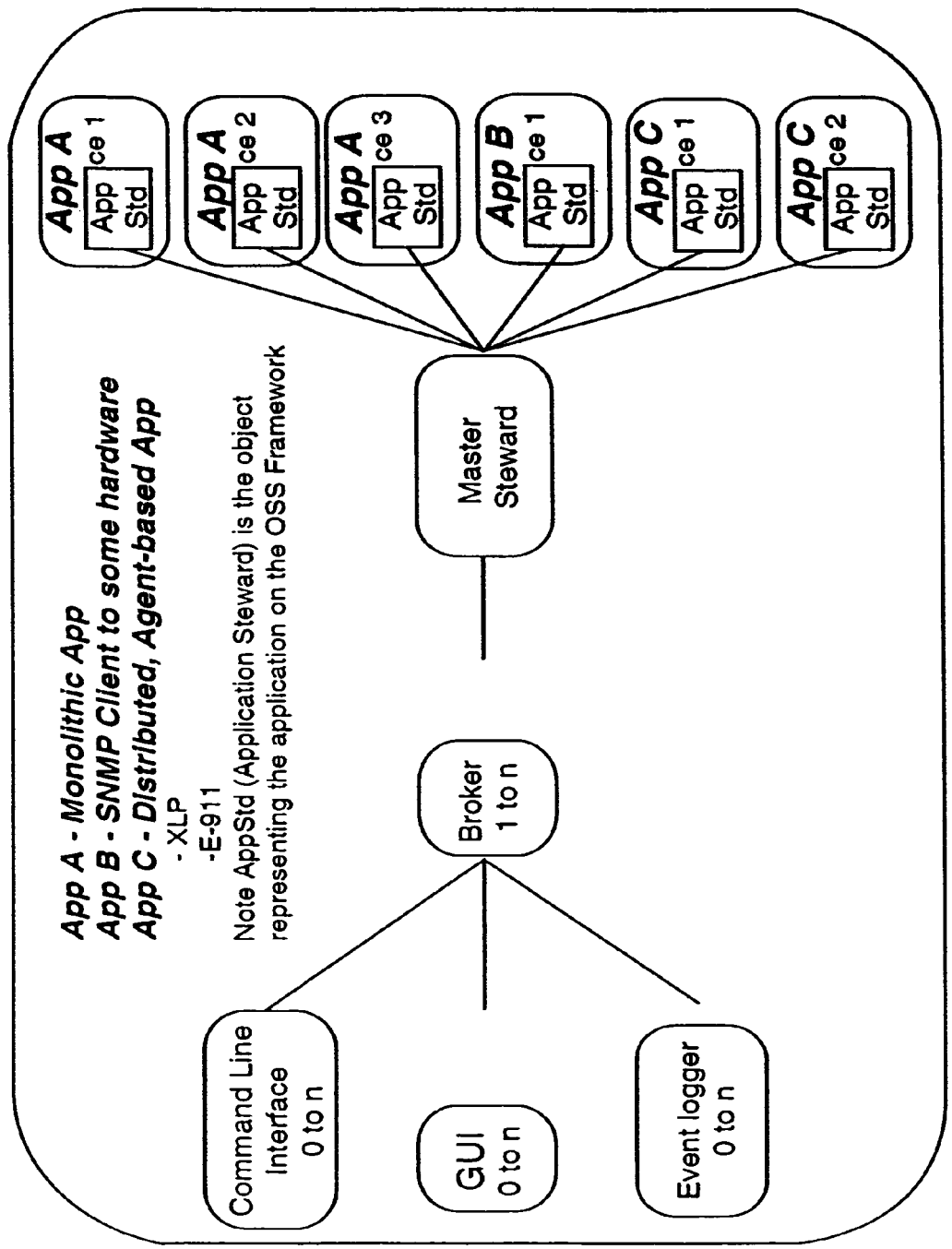
FIG. 2 shows a usage diagram of an operational support system, in accordance with the principles of the present invention.

FIG. 2 shows a usage diagram of an operational support system, in accordance with the principles of the present invention.

Figure 3:
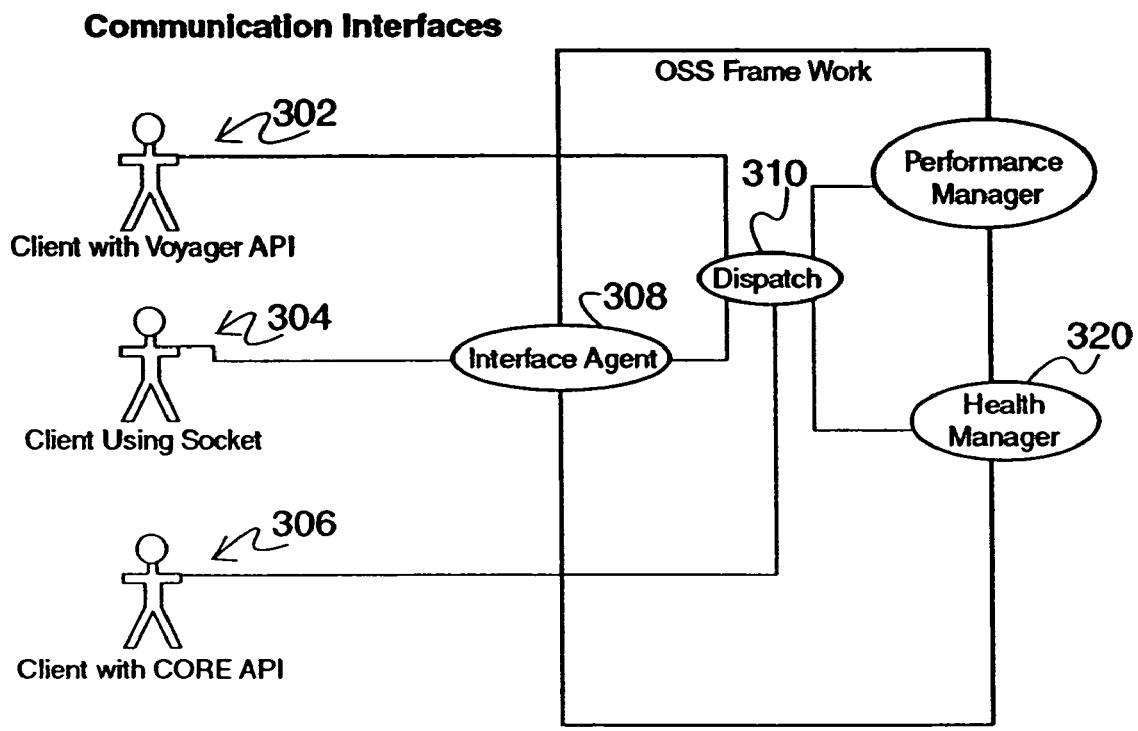
FIG. 3 shows communication interfaces in an OSS framework, in accordance with an exemplary embodiment of the present invention.

FIG. 3 shows communication interfaces in an OSS framework 100, in accordance with an exemplary embodiment of the present invention.

In particular, FIG. 3 shows a client application 302, a client using a socket 304 to communicate with an interface agent 308. The interface agent forwards messages to a dispatcher 310. The clients use a core API directly.

In the communication interface shown in FIG. 3, a listening server process on a well-known port accepts and translates OSS framework 100 messages encoded in XML. The OSS API (e.g., VOYAGER™ commercially available from Tele-Communication Systems, Inc. (SCS) in Annapolis, Md.) sends OSS requests encoded in either XMF (Ushers), XML, a Document Object Mode (DOM), or some other XML facilitation object. The core API sends OSS requests encoded in XMF (Usher).

FIG. 3 also shows a health manager 320. The purpose of health management is to provide a means to assess the health of applications on the platform and to take action when appropriate. Health management is the monitoring and maintaining of network elements at runtime. A managed network element is any entity constructed for manageability through any of the network management protocols (SNMP, JMX, TL1, etc.). Managed network elements that are managed via the platform (e.g., a Voyager™ Platform) are known as Voyager Managed Elements (VME). A VME can be an application, and aggregation of components, or an individual component itself. VMEs are able to push events and provide health status information to the OSS framework 100. The OSS framework 100 also pulls health data from elements. This ensures interfaces obtain the latest data consistently.

Figure 4:
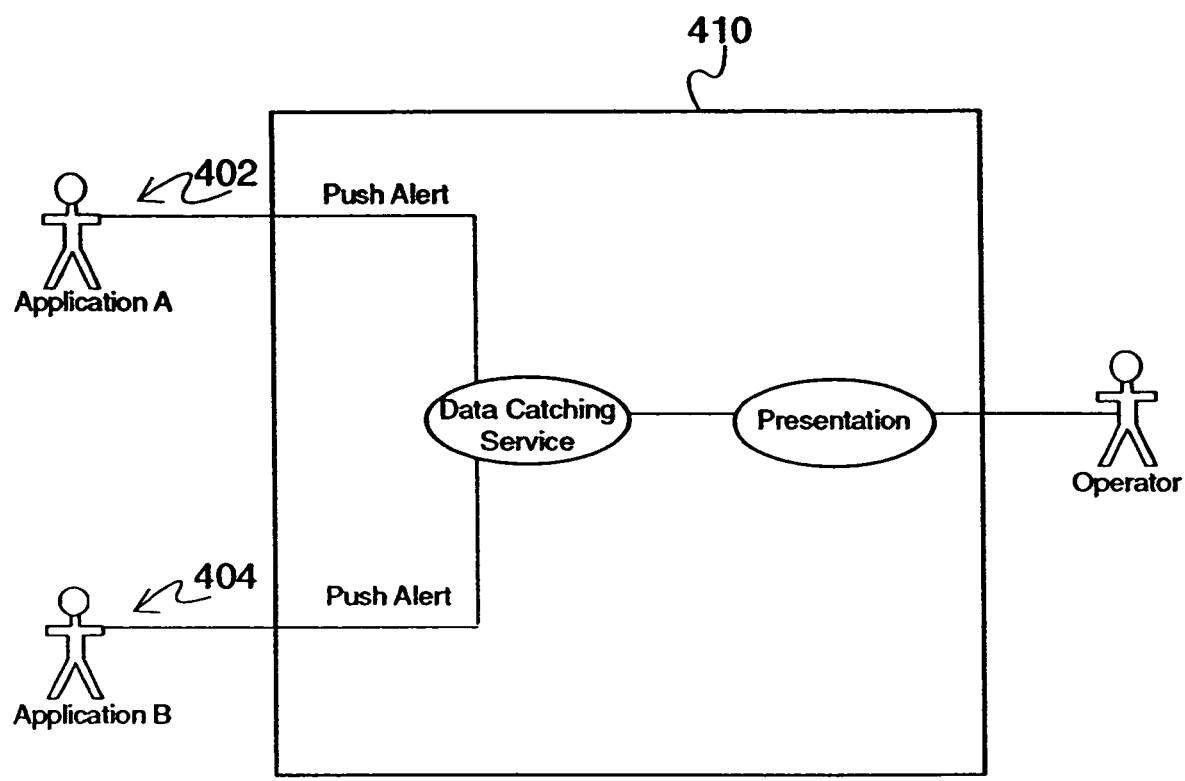
FIGS. 4 and 5 show a stimulus/response sequence of a push model (FIG. 4) and a pull model (FIG. 5), in accordance with an embodiment of the present invention.
Figure 5:
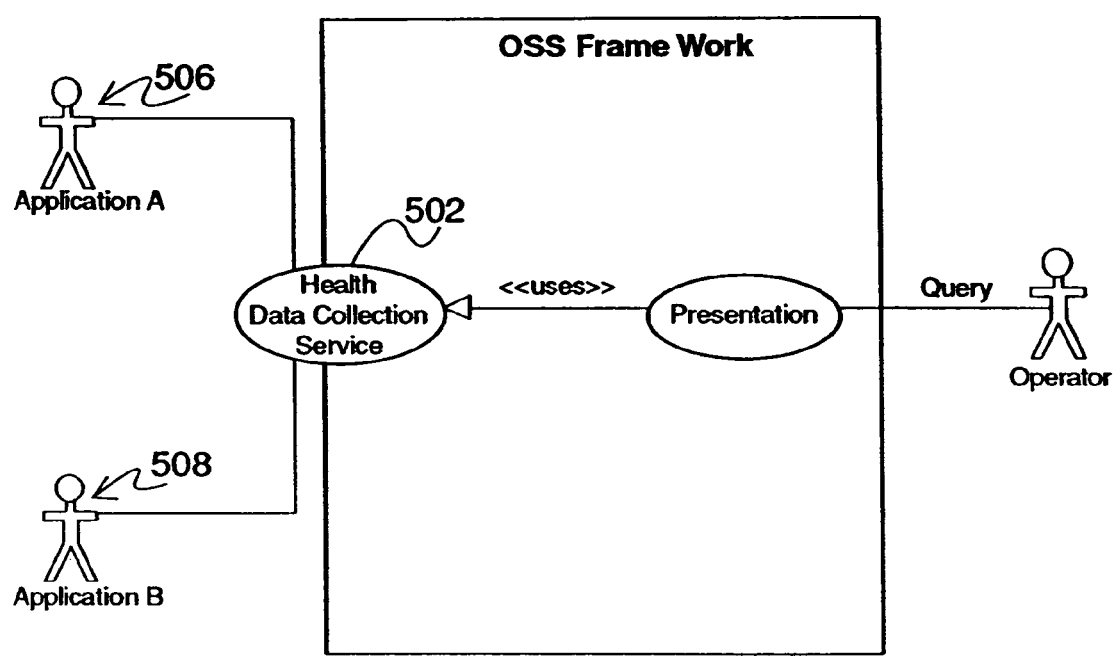

FIGS. 4 and 5 show a stimulus/response sequence of a push model (FIG. 4) and a pull model (FIG. 5), in accordance with an embodiment of the present invention.

In particular, as shown in FIG. 4, VMEs 402, 404 submit event or alert management data to the OSS framework 100 410. Event/alert collection services receive the messages via the platform and process them at the presentation layer user interface display, or persistent storage.

In accordance with FIG. 5, applications interested in health management data submit a request for data to a health data collection service 502. The health data collection service 502 submits health status queries directly to the appropriate VME 506, 508 based on the type of query (e.g., type 1 to type n). The VMEs 506, 508 return their responses to the health data collection service 502, which aggregates the data as appropriate and returns the aggregated data to the client.

In the disclosed embodiment, it is preferred that Voyager Managed Elements (VME) have health management services installed enabling health management queries. VMEs will be able to utilize resources within their lexical scope to satisfy Health Management queries. Health data collection services are able to query one VME, a group of VMEs, or all VMEs. VMEs preferably provide Voyager mandated fields in response to health management queries. VMEs can submit application specific data in accordance with their health management definitions.

Statistics management provides the means for agents and services on the OSS platform to record, store and analyze metrics. It provides real-time systems monitoring as well as a means to change performance related configuration at run time.

Applications on the voyager platform can use the statistics management interface to record application specific metrics. Applications use the data recording to record performance metrics such as messages sent per second, messages received, transaction process, number of failures, and other relevant metrics. The data can be stored locally, or push it to central storage real time. An information gathering service collects and consolidates performance data and passes it back to the caller of the service.

The performance management interface will also provide the interface to change performance related configuration variables of the application.

Content integration includes integration of XML, objects, and XMF. XML—Content will be sent as XML. Requests and responses can be encoded in XML. Objects—The caller will use a PMDataObject, which have the setter and getter of all the header information, as well as the Voyager specific fields. XMF—Custom XMF for the types of statistics can be provided for optimal performance. The user preferably populates the XMF object before sending it to the OSS framework 100.

Figure 6:
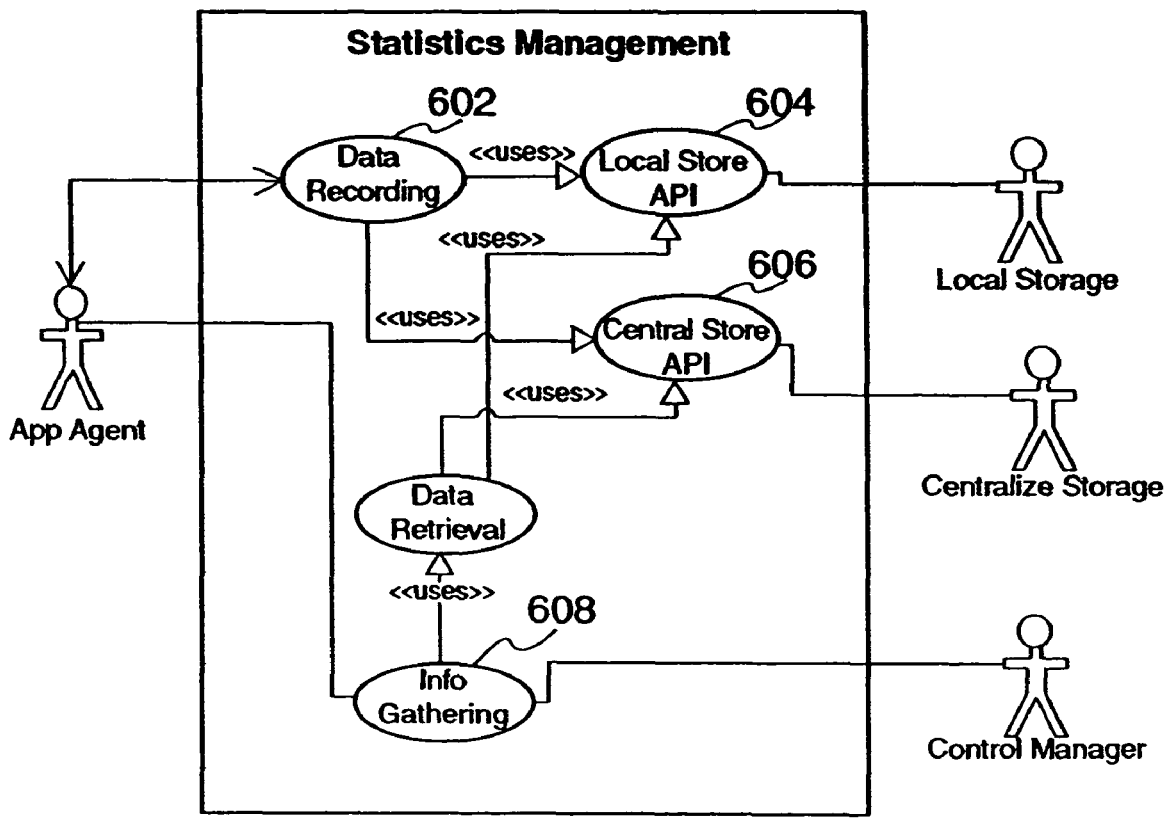
FIG. 6 is a stimulus/response sequence showing an exemplary embodiment of statistics management, in accordance with the principles of the present invention.

FIG. 6 is a stimulus/response sequence showing an exemplary embodiment of statistics management, in accordance with the principles of the present invention.

In particular, as shown in FIG. 6, the exemplary statistics management includes a data recorder 602, a local storage API 604, a centralized storage API 606, and an information gathering module 608.

The data recorder 602 is an interface for the application agent to implement and record the data in one of the 3 options 1) local only; 2) local and centralized storage; and 3) centralized storage only.

The local storage interface 604 allows objects to store performance data locally, either as a text file or into a database.

The centralized storage interface 606 allows objects to store performance data centrally, either as a text file or into a database.

The information gathering module 608 is a service that gathers performance data. The information gathering module 608 gathers both real time data from local storage and/or central storage. It preferably consolidates the data and passes it back to the respective calling agent.

Figure 7:
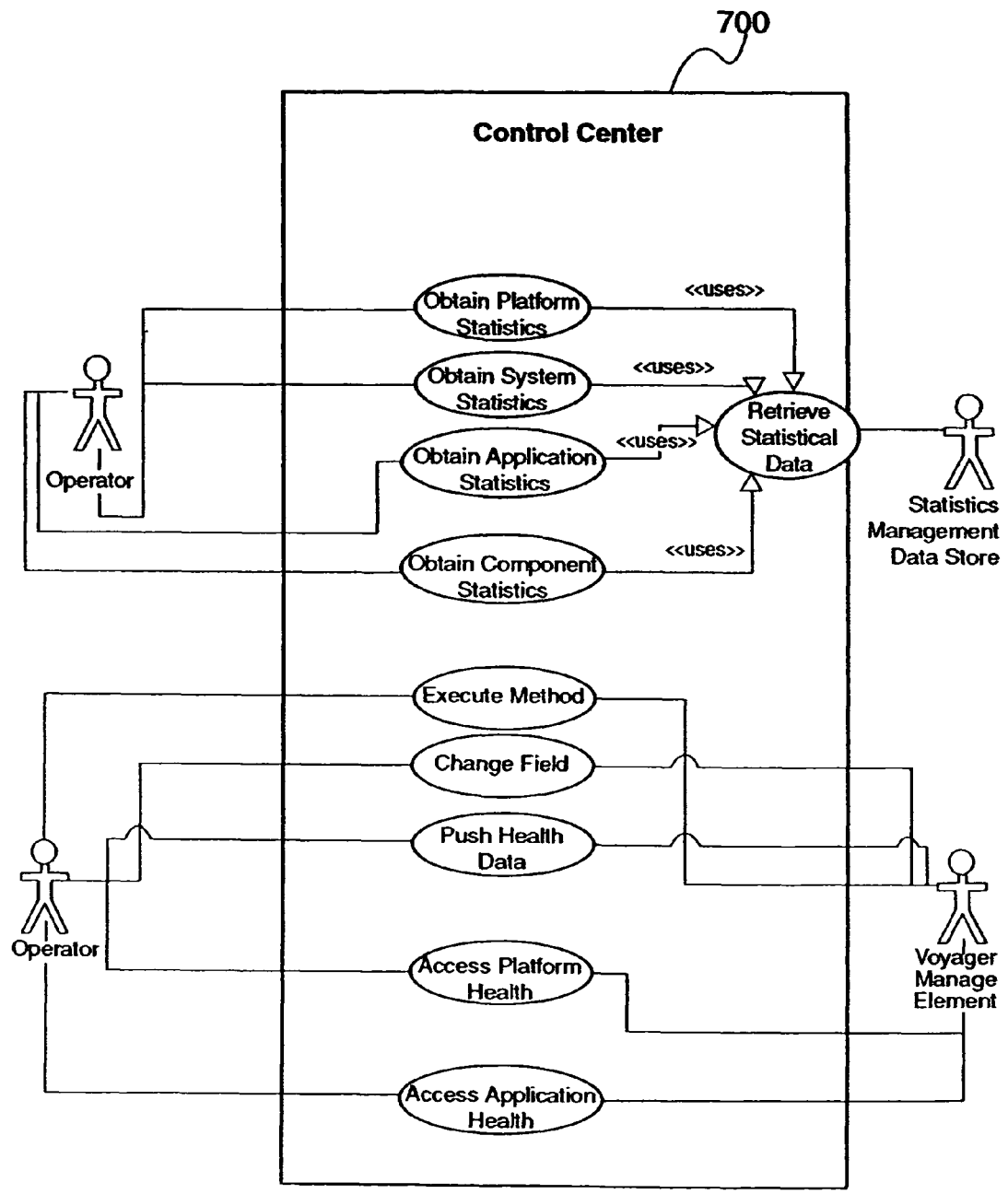
FIG. 7 is a stimulus/response sequence showing an exemplary control center use case diagram, in accordance with the principles of the present invention.

FIG. 7 is a stimulus/response sequence showing an exemplary control center use case diagram, in accordance with the principles of the present invention. The control center 700 provides a single interface to health management and performance management data for all elements of the OSS platform.

A single, consistent view of Voyager enabled applications makes the lives of systems operators much easier. The ability to assess everything from the entire deployment to a single component from one presentation provides an effective and efficient means of managing complexity.

The exemplary control center 700 complies with Model-View-Controller (MVC) architecture:

The Voyager Managed Elements (VME) serve as the Model. They provide the data and processing to fulfill any requests made to the control center 700. These can be a distributed application, and aggregation of distributed applications or even an individual component of an application.

The view is the presentation layer where the user interacts with an application. In the case of the control center 700, a web-based GUI or command line tools will provide the view. Other presentation layers views are possible, but preferably will utilize the same controller and model.

The controller is preferably provided by a UI controller service. The controller harvests data and executes operations to fully manage the Voyager elements and collect relevant performance data.

Among preferred functional requirements are that the control center 700 is able to accept event messages pushed from VMEs. The UI controller service accepts event messages from VMEs and pushes them to the presentation layer (e.g., control center 700, NMS). The UI controller service preferably has the ability to pull data from all VMEs asynchronously. The UI controller is preferably able to query health management and statistics management data stores. The VMEs can submit specific data in accordance with their appropriate health management schema definitions. VMEs include a means for pushing event messages, and are preferably able to provide any data specified in its schema definition.

The OSS Framework Interface

Conventionally, applications are managed as single entities. They are represented by SNMP sub agents and are viewed as individual nodes by a network management system (e.g., Openview, AdventNet WebNMS). Their components are encapsulated within the node and interaction is performed solely through the sub-agent.

The inventive OSS framework 100 enables multiple interoperating applications to be managed as separate distinct nodes riding on the Voyager Platform. Although one application may invoke the services of another, they are each managed as a single entity. Agents from different applications may request service from on another, but the federation of agents that comprises each application is managed a single node. The framework itself will insulate the managed entity from the management interface (SNMP, TL1, JMX). This is made possible by slight modifications to the applications and their agents.

An ApplicationSteward represents each application for management on the Voyager Platform. An application will start an ApplicationSteward either as a separate executable, or as a member of an application component. This is the node in which the components of the application are encapsulated. Variables that are available for queries and/or updates are accessed through this single node. The node itself has knowledge of the application's components and communicates with each to process their events and fulfill health management requests. This knowledge can either be statically defined or dynamically discovered. How an application determines its health can be customized, giving an application the flexibility to define its health in an appropriate manner.

The ApplicationSteward is an extension of the Agent class and as such has the ability to communicate with any Agent on the Voyager Platform. It is instantiated in a similar fashion to a typical Agent, but requires a few more pieces.

Each instance of an application will have a resource ID unique to that instance. For example, the $1^{st}$ instance of the WIG would be (WIG/1), while the $2^{nd}$ would be (WIG/2). The ApplicationSteward accepts registration requests from other Agents on a unique Multicast Channel. Agents then obtain the address of the ApplicationSteward assigned to that application instance. The ApplicationSteward is then able to perform queries and updates directly on the registered Agents. The Agents can send their traps directly to the Applications Steward. An application can have more than one ApplicationSteward.

It must be passed a class that implements the ManagementContainer interface. The goal of classes implementing this interface is two fold: First, to provide management business logic for fields not directly accessible by the Voyager Platform (not extensions of the class configurable), and second to provide the logic necessary for a managed application to determine its overall health.

This class contains health management methods that can be customized to permit existing objects to expose themselves as manageable objects at runtime. These methods define the interface needed by the OSS framework 100: Query, update, invoke, GetManageable Fields, GetInvocableMethods, and AssessHealth.

The query accepts a key and returns its value.

The update accepts a key and a value, and sets the variable associated with the key to the value.

The invoke accepts a method name, and invokes the appropriate method on the appropriate managed object.

The GetManageableFields returns a list of all fields registered with the ApplicationSteward as manageable.

The GetInvocableMethods returns a list of all methods registered with the ApplicationSteward as invocable.

The AssessHealth contains customized business logic necessary for the application to fulfill a request for its health status. The method must produce the information required by the OSS framework 100 to adequately represent that health of the application (see Health Assessment Protocol below).

The OSS framework 100, in conjunction with the Voyager Platform, delivers the message request to the ApplicationSteward and handles the communication necessary to fulfill all requests except the customized assessment of overall health (AssessHealth). The ApplicationSteward ensures that the proper member function of the ManagementContainer is called based on the request.

Health Assessment Protocol

A user interface to the OSS framework 100 can request the health status of an application. It does this by sending a health assessment request to the ApplicationSteward representing the application. The application obtains its ManagementContainer objects and calls its assessHealth method. Each application will determine its health in its own custom fashion and respond with a health assessment message. The health assessment message is an XMF structure containing values required by the OSS framework 100. The required fields are: Application ID, Sub-Application ID, State, Health Indication, Message, Subsystems, Priority, and Online.

Exemplary application ID values include WIG, XLP, 911 and HPDE.

Exemplary sub-application ID values include application instance resource ID.

Exemplary state values may include starting up, initializing, running, and shutting down.

Exemplary health-indication values may include green, yellow and red.

Exemplary messages include any relevant description of the health of the application.

Exemplary subsystems includes the status of subsystems can be nested within the response for the status of the application.

Exemplary priority values include the priority of this status message, and may indicate if special processing is required.

Note that the definitive status of the Application may be indeterminate.

Applications on the Voyager Platform are preferably managed consistently, regardless of their architecture. There are two types of applications that can be managed on the exemplary OSS platform: peer-to-peer service based applications, and standalone applications.

The peer-to-peer service based applications are those composed of a federation of agents invoking services of one another in a peer-to-peer manner (XLP, 9-1-1).

The Voyager Enabled standalone applications are those built on other technologies that use the Voyager platform as an integration point (WIG).

The requirements to register each of these applications for health management will likely differ, but once registered, the OSS framework 100 manages each consistently. The constant between both types is the presence of the ApplicationSteward. Each application has an ApplicationSteward that represents them. The interaction with the application steward is where the 2 types of applications may differ. The integration methodology for each is as follows:

Peer-to-Peer service based applications may be managed on the OSS platform. The OSS platform is used for runtime queries, updates, and method invocation through the use of Configurables. XMF messages are sent to fulfill queries, execute updates and invoke functions in common place.

There is an aggregation point in which SNMP messages for particular SNMP OIDs are translated to XMF messages, and then sent to the appropriate Agent to satisfy the request. This aggregation point, however, is for the entire platform and does not discern between applications. It requires a global MIB for all applications. Individual MIBS for distinct applications can exist and each would translate the SNMP to XMF and submit it to the OSS framework. A global MIB is thus not necessary.

Event management (SNMP Trap) is performed using SNMP directly. Component uses Emanate classes to send the trap to the Emanate SNMP SubAgent. This ties the Voyager Core to third party SNMP packages. This is the current state for XLP and E-9-1-1. The OSS framework removes these dependencies.

To integrate a peer-to-peer application, agents preferably include a resource ID that represents the application instance that they are a part of. On startup, agents broadcast on the application steward multicast channel to obtain the address of their ApplicationSteward, and register themselves with their ApplicationSteward. Discovery of the ApplicationSteward is analogous to discovery of brokers. Failure to configure an agent with this multicast channel does not compromise backward compatibility.

The agent and its services use the trap generation method of the agent to send traps into the OSS framework 100.

An Application Steward can be run for their Application/Instance resource ID. It could be standalone, or even a substitute for one of the agents that is also performing application specific duties. Services provided by the ApplicationSteward include: 1) registering all the agents belonging to the Application/Instance resource ID; 2) Query/update from the manageable fields (Configurable fields); and 3) processing events (i.e., traps).

Note that queries and updates would not change at all. Only trap generation would change. The ApplicationSteward is preferably able to determine the configurable fields of all the agents registered with it and can execute queries and updates against those fields in typical Voyager™ fashion.

Standalone applications may be enabled on the OSS framework 100. An external API is accessible through the OSS Platform, but the core architecture need not rely on the Voyager Platform. For instance, existing, standalone applications such as a Wireless Internet Gateway (WIG) commercially available from TeleCommunication Systems, Inc. in Annapolis, Md., do not use the Voyager Platform to perform their duties.

The disclosed wireless Internet gateway (WIG) uses a third Party SNMP solution handles queries, updates, and traps. Non-Voyager mechanisms (RMI) are used to communicate between the SNMP SubAgent and the application's manageable fields.

The application preferably has a direct reference to its ApplicationSteward, and will, thus use it to generate traps in a similar fashion to Peer-to-Peer Service Based Applications. Variables that need runtime configuration or methods that must be dynamically invoked should be accessible by the ApplicationSteward. They have to register these variables with a ManagementContainer (Interface). They create a custom class that implements the ManagmentContainer Interface. The OSS framework 100 uses this class to satisfy queries, updates, method invocation, and overall health assessment.

The OSS framework 100 provides application developers with a single abstraction of health management, performance measurement and statistics management. Based on the model-view-controller pattern, the OSS framework 100 provides a distinct separation between the application data and its presentation. This permits multiple views (control center 700, command line tools) to use the same infrastructure to ensure a consistent and reliable picture of an application and its components.

An OSS framework 100 in accordance with the principles of the present invention provides a single health management and performance measurement infrastructure for all applications that will be presentation neutral. It provides an API for applications familiar with a relevant API, e.g., the Voyager API, and are built on a peer-to-peer service driven model. An API is also provided for applications not familiar with the relevant API (i.e., and are thus built as stand-alone applications). The OSS framework 100 also provides a statistics management interface enabling applications to store and retrieve application specific data through the relevant platform, e.g., through the Voyager Platform. The OSS platform also provides presentation layer facilities (control center GUI and command line tools) that present and manage the OSS framework 100 data in a reliable and consistent manner.

Figure 8:
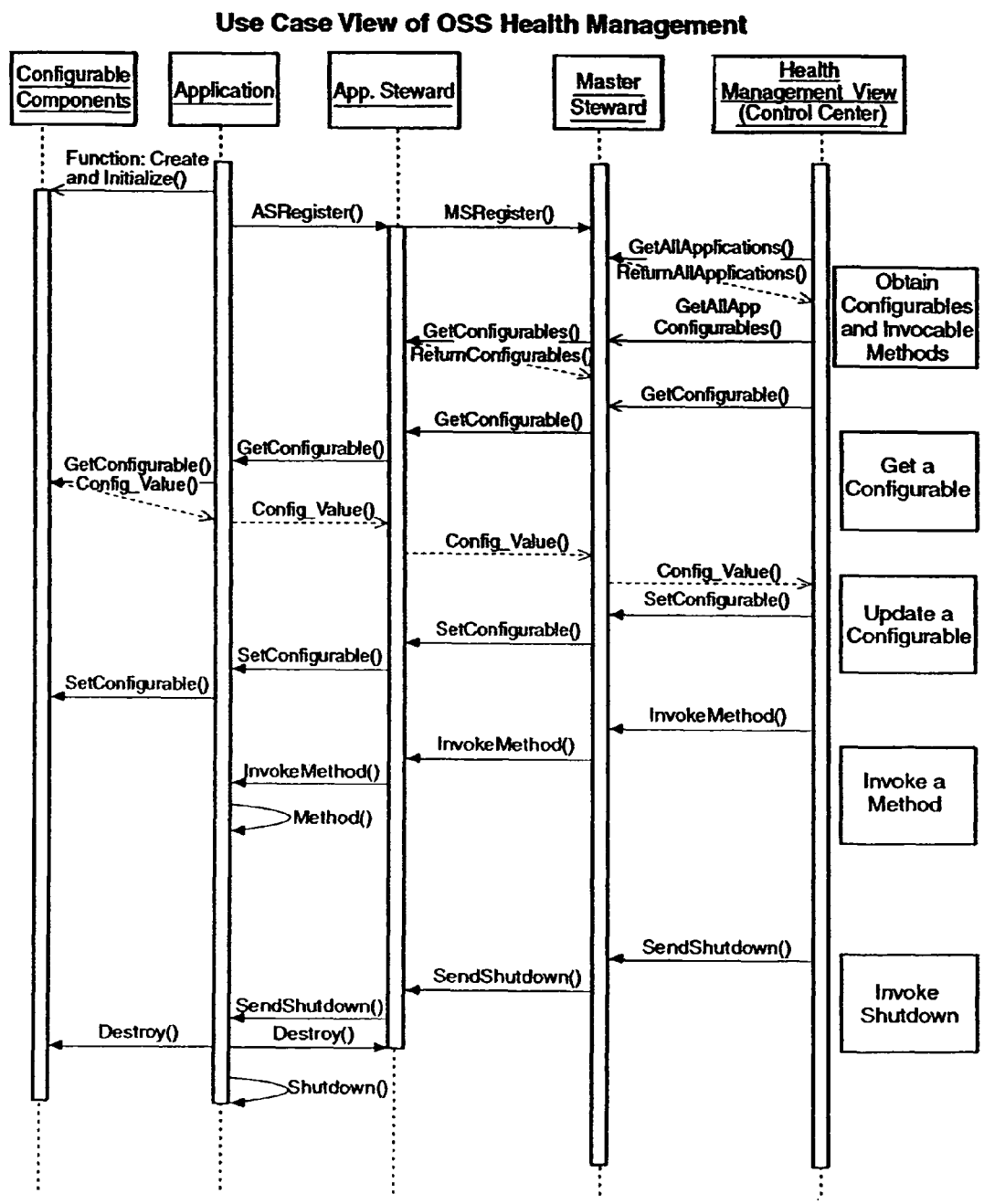
FIG. 8 shows an exemplary use case view of an OSS Health Management system, in accordance with an embodiment of the present invention.

An exemplary health management subsystem preferably performs runtime interaction with managed entities. The following use case view depicts the four health management operations:

FIG. 8 shows an exemplary use case view of an OSS Health Management system, in accordance with an embodiment of the present invention.

In particular, as shown in FIG. 8, configurable components and invocable methods are obtained. The control center (presentation layer) sends a request for the configurable components and invocable methods to a health management subsystem in accordance with the principles of the present invention.

A configurable component is queried. The control center 700 sends a query request for a specific configurable component to the health management subsystem.

A configurable component is updated. The control center 700 sends a request to update a specific configurable component to the health management subsystem.

A method is invoked. The control center 700 sends a request to invoke a method registered as invocable to the health management subsystem.

Figure 9:
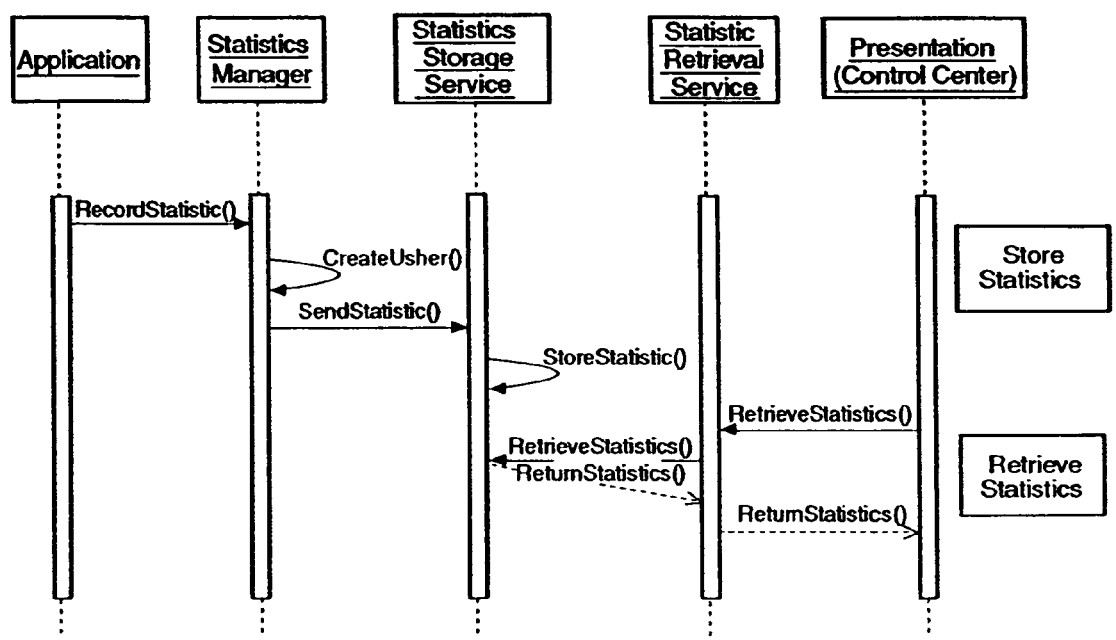
FIG. 9 shows a use case view of an exemplary OSS Statistics Management system in accordance with an embodiment of the present invention.

FIG. 9 shows a use case view of an exemplary OSS Statistics Management system in accordance with an embodiment of the present invention. The Statistics Management subsystem provides applications with the ability to use an OSS Platform to store and retrieve statistics. The use case view shown in FIG. 9 depicts an application using the statistics management subsystem to store historical data.

As shown in FIG. 9, a statistic is stored. An application sends a storage request to the OSS framework 100. The request contains the data to be stored and subsystem specific parameters.

FIG. 9 also retrieves a statistic. A control center 700 (presentation layer) sends a request for information to the OSS framework 100. The request contains the statistic in question and the subsystem specific parameters necessary to define the type of query.

Figure 10:
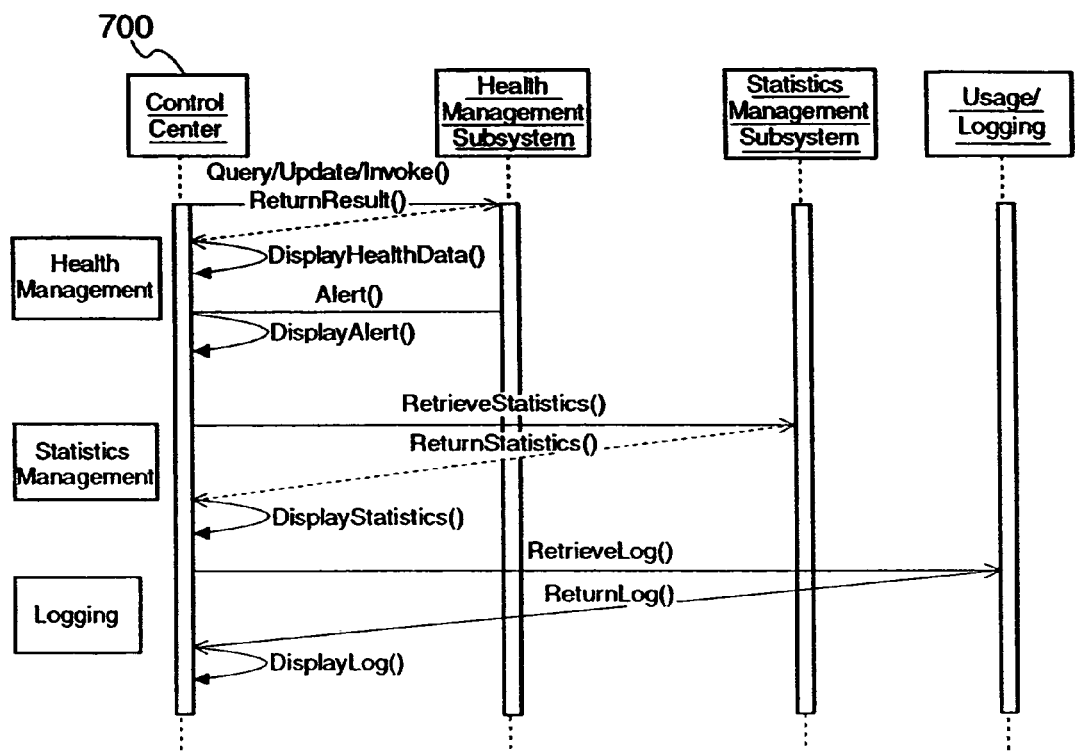
FIG. 10 shows a use case view of an exemplary OSS control center, in accordance with an embodiment of the present invention. logging subsystem.

FIG. 10 shows a use case view of an exemplary OSS control center 700, in accordance with an embodiment of the present invention.

In particular, as shown in FIG. 10, the control center 700 represents the presentation layer for several subsystems available on the Voyager Platform. The functions of the control center 700 are as follows:

The control center 700 initiates a Query/Update/Invoke Interaction with the health management. The control center 700 also accepts Alerts ("Traps") and displays them.

The control center 700 requests statistics from the statistics management subsystem. It also requests logging information from the logging subsystem.

Figure 11:
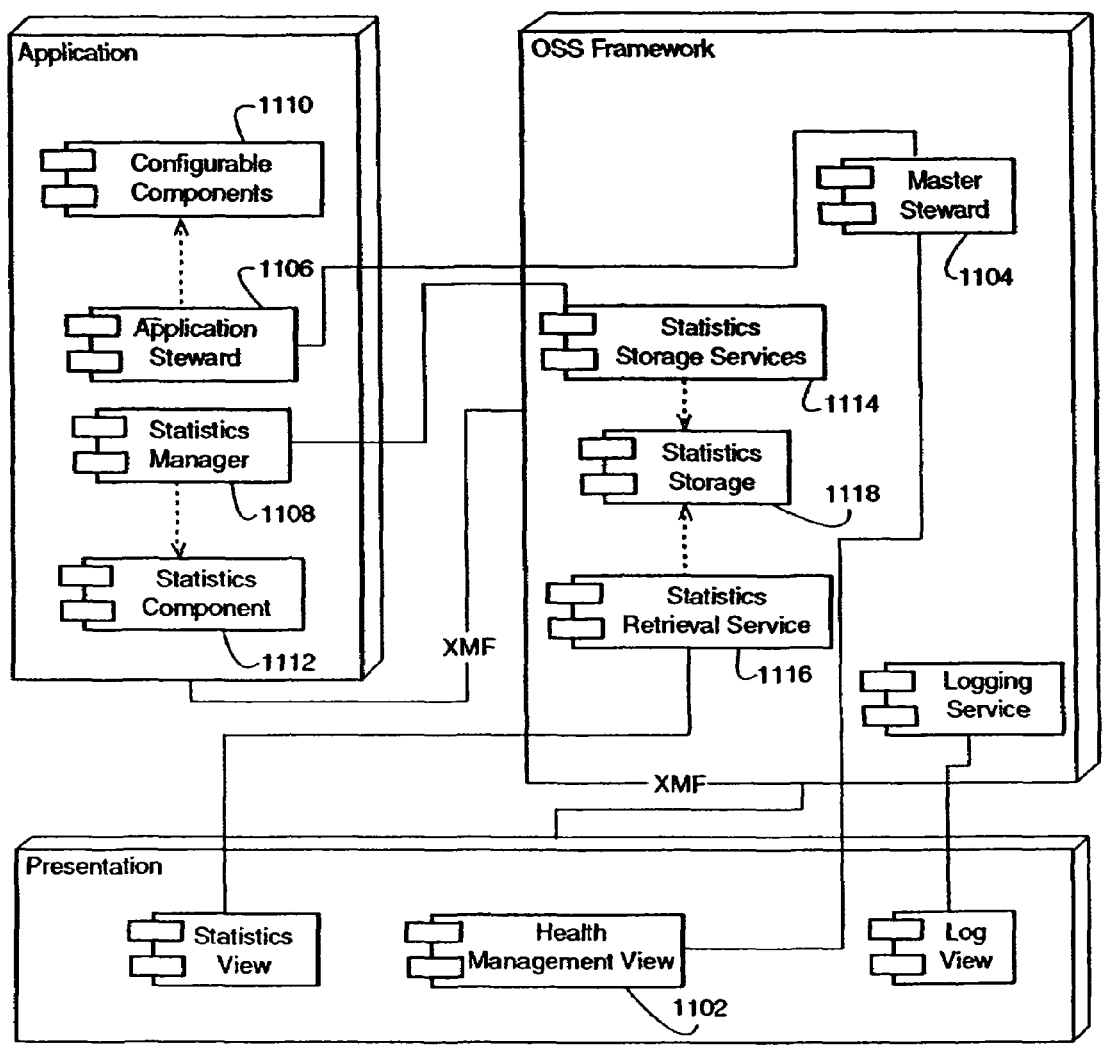
FIG. 11 shows an exemplary logical view model of the OSS framework, in accordance with an embodiment of the present invention.

FIG. 11 shows an exemplary logical view model of the OSS framework 100, in accordance with an embodiment of the present invention. The OSS framework 100 provides applications with health management services, statistics management services, and control center tools. A logical view breaks these services and responsibilities into packages, subsystems and classes.

Health Management refers to the health assessment and dynamic runtime configuration of devices or applications. The following packages comprise health management on the Voyager Platform.

A health management view 1102 represents the presentation layer into the health management subsystem. The health management view 1102 communicates with a master steward 1104 to retrieve the health information of the managed entities. The view determines how the health data will be processed and presented. The control center 700 provides two such views (GUI and command line tools).

The master steward 1104 has knowledge of all managed entities through their application stewards 1106. When requests arrive from the presentation layer, the master steward 1104 routes it to the appropriate application steward 1106 and returns the results to the presentation layer. Likewise, when an application steward 1106 generates events (or "traps"), they are caught by the application steward 1106 and forwarded to each view (control center GUI and command line tools). The master steward 1104 also provides the insulation between the network management interfaces and the managed entities. Network Management Stations (NMS) send SNMP or JMX requests to the master steward 1104. He then uses the health management subsystem to satisfy the request. Events caught by the master steward 1104 can be forwarded to the NMS as it would to any presentation layer view.

The application steward 1106 serves as the health management proxy for the managed entity. It satisfies all service requests based on its knowledge of the application instance it represents. It also catches and forwards all events generated by the components of an application and forwards them to the master steward 1104.

The configurable components 1110 are manageable pieces that comprise a managed entity. They may be the individual variables contained within the agent processes that comprise a total application, or they may be the application objects themselves that are managed directly by the application steward 1106. They contain data that can be queried or updated at runtime.

The statistics Manager 1108 gives applications the ability to push statistical data to repositories in a configurable manner. Statistics management is comprised of statistical components 1112, statistics storage service 1114, statistics retrieval service 1116, and statistics data repository 1118.

In particular, the statistical components 1112 are the objects of an application whose data is persistently stored via the OSS framework 100. They reside within the business logic modules of applications. They also exist within the OSS framework 100 itself for internal purposes.

The statistics storage service 1114 accepts messages containing the data of statistical components 1112 and persistently stores this data depending on the configuration of the service.

The statistics retrieval service 1116 accepts messages requesting the retrieval of certain statistics data based on criteria established by the parameters of the message.

The statistics data repository 1118 stores statistics management data. Depending on configuration, this can be, e.g., an RDBMS, a flat file, or an XML document.

The control center provides the user interface into the OSS framework 100. The control center preferably houses views of the health management and statistics management portions of the OSS framework 100 as well as the logging and usage services of the Voyager platform. These views define the presentation of data and also possess the ability to initiate OSS operations.

The graphical user interface (GUI) provides a single point of access to the user for all OSS framework 100 functionality as well as logging and usage services.

Command line tools provide utilities to access the unique public functions of the OSS framework 100 and logging and usage services.

An implementation view attempts to allocate the packages and subsystems of the logical view to layers and components.

The presentation layer interfaces with the user. This layer accepts input from the user and displays data. The presentation layer comprises the control center, and command line tools.

Business logic defines the rules of access and transformation of data. It governs how the application shall perform its responsibilities. The business logic layer comprises an application steward 1106, a master steward 1104, and configurable components 1110.

The application steward 1106 determines the best means of satisfying a request for health management services. It manages the validity of a request and executes the necessary logic to satisfy the request.

The master steward 1104 routes requests to the proper application steward 1106. This highly cohesive actor contributes to scalability and flexibility of design.

Managed nodes can be configured to push data to persistent statistics management services. This package resides in both a business logic layer and in a data access layer due to the two distinct roles configurable components play in the health management and the Statistics Management subsystems.

The data access layer is where direct interaction with the data is performed. The data access layer comprises configurable components 1110, statistics retrieval service 1116, and the statistics storage service 1114.

The health management subsystem uses configurable components to access the data to satisfy queries and updates. This package resides in both a business logic layer and in a data access layer due to the two distinct roles configurable components play in the health management and the statistics management subsystems.

The statistics manager 1108 accesses persistently stored statistics through the statistics retrieval service 1116. A query request is sent and the appropriate result is returned.

The statistics manager 1108 stores data persistently by sending the data in a storage request to the statistics storage service 1114.

The Voyager Platform provides communication vehicles between the subsystems supporting health management, statistics management, and the presentation layer (i.e., the control center and command line tools).

Source code, data files, components, executables, and other accompanying artifacts pertaining to packages and subsystems of the same implementation layer are structured together in the development environment. For example, all resources necessary for the development of command line tools are stored in a peer structure to that of the control center GUI. The OSS framework 100 is available to all applications utilizing the Voyager platform.

A process view of the Voyager platform takes into account performance and system availability requirements. This includes addressing runtime behavior of the system through process interactions, tasks, threads, throughput, response time, and scalability methodology.

It is desired that the control center and command line tools be single executable. The threading model provided by the Voyager platform's agent ensures proper thread management. Message responses are processed in a thread safe manner, e.g., pulls and pushes are processed to ensure presentation consistency and accuracy. Command response time is desirably under a predetermined time limit, e.g., under 4 seconds.

Each master steward 1104 is instantiated in it's own process. The master steward functionality is inherently thread-safe. The Voyager platform provides thread management. There can be more than one Master Steward.

Application stewards 1106 can be started within a dedicated executable and wait to be shut down. Application stewards 1106 can be created within the initialization of an application containing the application steward 1106. The Voyager platform provides thread management for the application steward 1106 while the containing application provides its own thread management.

Configurable components are accessed and operate independently of the thread of execution in which they are instantiated. The Voyager platform provides thread management for responses to health management operations as well as statistics management pushes.

A single executable can house the statistics management retrieval service and the statistics management storage service. The Voyager platform provides thread management. Writes are preferably maintained to ensure data integrity.

Preferably, response time to any request other than for statistics management data retrieval does not exceed, e.g., 5 seconds. Requests for statistics management data retrieval does not exceed, e.g., 60 seconds. Also, preferably, the health management and statistics management will not degrade the performance of any application. Scalability is attainable due to certain attributes of the OSS framework 100, e.g., dynamic application interaction, high cohesion, and low coupling.

The Management Container defines the contract between an application and the OSS framework 100 for exposing application specific business logic in satisfying health management requests. An application's specific ManagementContainer implementation class will contain the custom business logic necessary to properly fulfill any of the health management requests. Implementation classes can place references to application objects in their ManagementContainer and, thus manage these objects at runtime by properly exposing these objects through the methods of the ManagementContainer. A DefaultMgtContainer is available for sub classing that provides a benign implementation of the ManagementContainer interface. Furthermore, an ExaminerMgtContainer is available that reflectively discovers how to manage any object passed to it.

For example, an application may have an object Foo that has fields A and B (accessible through setters and getters). The application would implement a class with a reference to this Foo object and place the logic necessary to return its value and mutate it in the appropriate methods of the interface.

Methods can also be registered that perform any tasks on the objects contained within the implementation class as well as issue Voyager service requests via the ApplicationSteward.

A HealthStatus interface defines the HealthStatus of an element of an application. It can represent the application as a whole, or any subsystem.

The ManagementContainer contains the business logic for determining the health of the application, while the HealthStatus defines the protocol for communicating that information to the OSS framework 100 in a meaningful way. It is merely a class that captures the health of an application and its subsystem (through nested HealthStatus objects). The OSS framework 100 parses these objects and processes them appropriately.

The ApplicationSteward class is an application's point of representation for OSS support on the OSS framework 100. An ApplicationSteward is configured with a ResourceID that announces itself as representing a particular product and instance (i.e., Application ID, "WIG/1"). When an ApplicationSteward is instantiated, it discovers the MasterStewards that are running and registers with them. The MasterSteward forwards all OSS related requests to the appropriate ApplicationSteward. Each ApplicationSteward has a ManagementContainer which is contains any resources necessary to carry out these OSS requests. Application events (i.e., "traps") are also submitted through the ApplicationSteward. These events are forwarded to the OSS framework 100. This class may be instantiated either within a class within the scope of an application, or within a wrapper class encapsulating the application itself.

The MasterSteward is the central router for OSS requests in the OSS framework 100. It has knowledge of all applications running on the Voyager platform. It maintains a table matching a given application instance ID against the IP address of that instance's ApplicationSteward. Requests for health information are forwarded to the appropriate ApplicationSteward for service. The ApplicationSteward is the entity with intimate knowledge of the application it represents.

The MasterSteward is similar to a Broker, but is only interested in and only serves OSS requests. The only entities it is intended to interact with are ApplicationStewards and ControlCenterViews. The MasterSteward discovers ApplicationStewards and ControlCenterViews using a specific Multicast Address that is well known.

The MasterSteward listens on the MasterSteward channel and adds ApplicationStewards to its Map of addresses. When a request comes in for a specific application, the MasterSteward obtains the target ResourceID of the appropriate ApplicationSteward and forwards it the request. The results are then returned to the requester.

A Broker is the generic messaging router for the Voyager platform and the OSS framework 100. OSS requests submitted from the presentation layer (ControlCenterView) are load balanced through the broker to a MasterSteward. Each MasterSteward is able to get the request to the appropriate ApplicationSteward. It auto-discovers all MasterStewards and distributes requests equitably.

The ControlCenterView is the access point into the OSS framework 100 for the presentation layer client tools. OSS requests are submitted through this class. The requests are submitted to the OSS framework 100 and results are return as specified by the API.

Command interface and implementation classes ease development of combining ControlCenterView commands into more robust and complex commands.

The ControlCenterView class can be instantiated in any client tool as it provides an abstraction of the OSS framework 100. Any client is guaranteed the same behavior through this single point of access. It also provides a command line interface that reads the command to be executed from a command line, loads the appropriate class (which implements the command interface) and displays the result to the designated output stream (Stdout is the default).

The interface ManagementContainer may be the sole class implemented by the application developer. It contains resources necessary to fulfill OSS requests. Options for the ManagementContainer class may include, e.g., the ability to pass any class adhering to the Java Bean pattern to the ExaminerMgtContainer, which reflectively examines the object. To take advantage of the health assessment functionality of the OSS framework 100, the ExaminerMgtContainer may be extended and the assessHealth method overridden to capture application specific business logic.

The OSS framework 100 design provides application developers with a single abstraction of health management, performance measurement and statistics management. They are able to view an overall snapshot of an application or dive into the troubleshooting details. The OSS framework 100 may be divided into three subsystems: health management, statistics management, and control center tools.

The file Usher_OSS.xmf contains latest messages.

| # | Message | Responsibility | Details |
|---|---------|----------------|---------|
| | | Messages | |
| 1 | Usher_OSS_HM_QueryOverallHealth | Obtains the overall health of an application. | |
| 2 | Usher_OSS_HM_QueryOverallHealthR | Returns the overall health of an application. | |
| 3 | Usher_OSS_HM_QueryApps | Obtains a list of all the applications. | |
| 4 | Usher_OSS_HM_QueryAppsR | Returns the Application ID and the Sub-Application ID of the instance represented by an Application Steward. | |
| 5 | Usher_OSS_HM_Query | Used to query for one, a set, or all configurable components registered with an application. | This Usher is used to communicate the query from the View to the MasterSteward and then, again, from the MasterSteward to the appropriate ApplicationSteward. |
| 6 | Usher_OSS_HM_QueryR | Used to return query results. | |
| 7 | Usher_OSS_HM_Update | Used to update one, a set, or all configurable components registered with an application. | This Usher is used to communicate the update request from the View to the MasterSteward and then, again, from the MasterSteward to the appropriate ApplicationSteward. |
| 8 | Usher_OSS_HM_UpdateR | Returns update status message. | |
| 9 | Usher_OSS_HM_Invoke | Used to invoke a method that is registered with an ApplicationSteward. | This Usher is used to communicate the invocation request from the View to the MasterSteward and then, again, from the MasterSteward to the appropriate ApplicationSteward. |
| 10 | Usher_OSS_HM_InvokeR | Returns the status and possible return values. | |
| 11 | Usher_OSS_HM_Trap | Used to deliver an event ("trap"). | This Usher is used to communicate the invocation request from the ApplicationSteward to the MasterSteward and then, again, from the MasterSteward to all ControlCenterViews. |
| 12 | Usher_OSS_AS_Registration | Used to register an Agent with an ApplicationSteward | An Agent is a component of the larger application that is represented by the ApplicationSteward. |
| 13 | Usher_OSS_MS_Registration | Used to register an ApplicationSteward with a MasterSteward | ApplicationStewards register their App ID and Instance ID with MasterStewards. |
| 14 | Usher_OSS_STAT_Store | Used to submit statistics for persistent storage. | The StatisticsManager object creates this Usher when attempt to store statistics. |
| 15 | Usher_OSS_STAT_Retrieve | Used to retrieve persistently stored statistics. | The ControlCenterView creates this Usher when retrieving statistics. |
| 16 | Usher_OSS_STAT_RetrieveR | Returns statistics query results. | |
| | | Service ID(s) | |
| 1 | SID_MS_QueryOverallHealth | Forward the request for overall health to the appropriate ApplicationSteward. | |
| 2 | SID_MS_QueryApps | Requests the Application Ids and Sub-Application Ids of all ApplicationStewards registered with the MasterSteward | |

-continued

| # | Message | Responsibility | Details |
|---|---|---|---|
| 3 | SID_MS_Query | Forward queries for one or more configurable components to the appropriate ApplicationSteward. | |
| 4 | SID_MS_Update | Forward update requests for one or more configurable components to the appropriate ApplicationSteward. | |
| 5 | SID_MS_Invoke | Forward method invocation requests to a particular ApplicationSteward. | |
| 6 | SID_MS_Trap | Forward event ("trap") requests to all ControlCenterViews. | |
| 7 | SID_MS_Registration | Register an ApplicationSteward with a MasterSteward. | |
| 8 | SID_AS_QueryOverallHealth | Obtain and return the overall health of the application | |
| 9 | SID_AS_Query | Obtain and return one or more configurable components. | Installed in the ApplicationSteward. Uses its knowledge of the application to satisfy the request. |
| 10 | SID_AS_Update | Update the value of one or more configurable components. | Installed in the ApplicationSteward. Uses its knowledge of the application to satisfy the request. |
| 11 | SID_AS_Invoke | Invoke a method. | Installed in the ApplicationSteward. Methods are registered as invocable with the ApplicationSteward. |
| 12 | SID_AS_Trap | Forward events ("traps") generated by the components of an application to the MasterSteward | Installed in the ApplicationSteward. |
| 13 | SID_AS_Registration | Register an Agent with an ApplicationSteward. | Installed in the ApplicationSteward. Applications that are comprised of many Agent's must register with an ApplicationSteward so they can be managed. |
| 14 | SID_VW_Trap | Forward events ("traps") requests generated by the MasterSteward to the processing class (ServiceProvider). | Installed in an Agent serving the ControlCenterView. Traps are received and then passed on to the ServiceProvider object, which processes the trap (ie, displays it). |
| 15 | SID_STAT_Store | Store statistics data persistently | Installed in an Agent and serving as a Service node. |
| 16 | SID_STAT_Retrieve | Retrieve statistics data based on the criteria specified in the request | Same as above. |
| | | Errors | |
| 1 | XY_FieldNotFound | Indicate the field in question could not be found. | |
| 2 | XY_MethodNotSupported | Indicate the method is not supported. | |
| 3 | XY_AppIDNotFound | Indicate the Application ID could not be found. | |
| 4 | XY_SubAppIDNotFound | Indicate the Sub-Application (instance) ID could not be found. | |
| 5 | XY_InvalidQuery | Indicate the query for persistent statistics is invalid. | |
| 6 | XY_ApplicationStewardUnreachable | Indicate the ApplicationSteward for an instance of an application could not be reached. | |
| 7 | XY_MasterStewardUnreachable | Indicate that a MasterSteward could not be reached. | |

Health Management Classes

The following classes comprise the health management subsystem. Each class is presented along with a description of its purpose.

Figure 12:
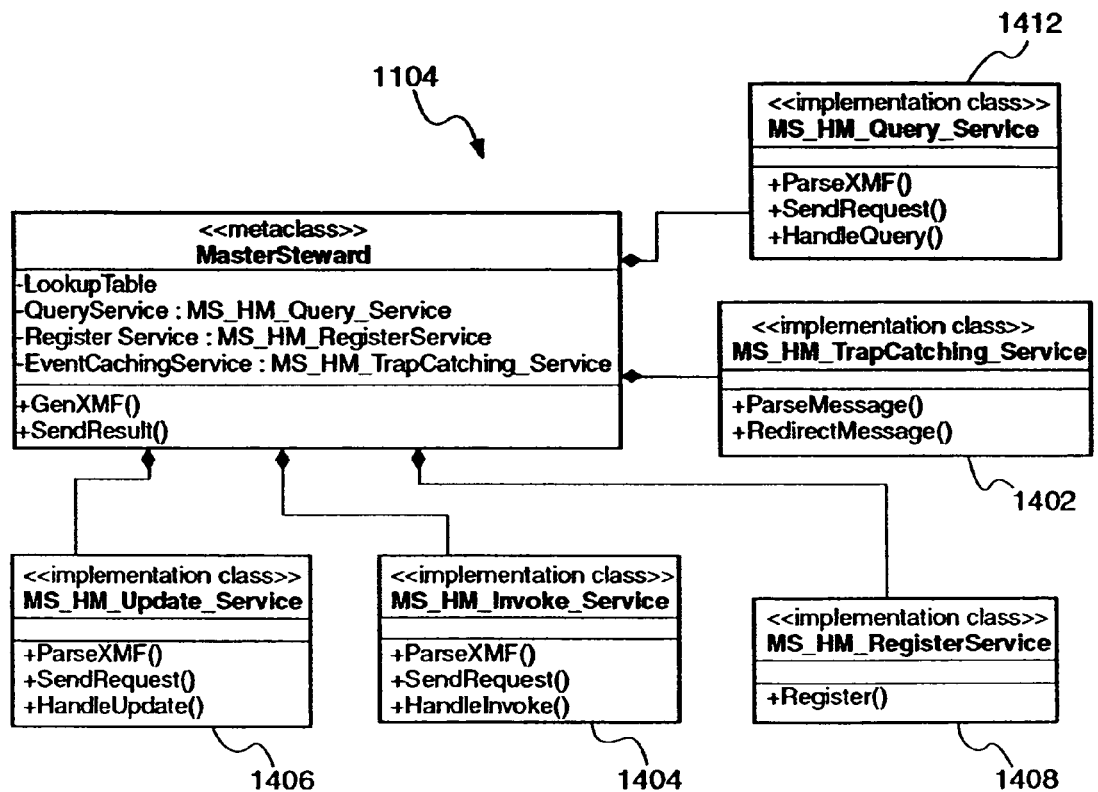
FIG. 12 shows a class diagram of an exemplary Master-Steward of an OSS management system, in accordance with the principles of the present invention.

FIG. 12 shows a class diagram of an exemplary MasterSteward of an OSS management system, in accordance with the principles of the present invention.

MasterSteward 1104

This class serves as the primary router for health management requests. It maintains knowledge of all the applications running on the Voyager platform. Views interested in health management information direct their requests towards the MasterSteward objects. The MasterSteward objects forward these requests to the appropriate ApplicationSteward objects depending on the nature of the request.

MS_HM_QueryOverallHealth_Service

This class is a service to be installed in a MasterSteward. It satisfies query requests from the presentation layer (ControlCenterView) for the overall health of an application instance. It forwards the request to the appropriate application depending on the nature of the request. After it has obtained the data necessary to satisfy the request, it returns the data to the requestor.

MS_HM_QueryApps_Service

This class is a service to be installed in a MasterSteward. It satisfies query requests for the application Ids and sub-application Ids of all the ApplicationStewards registered with this MasterSteward.

MS_HM_Query_Service 1412

This class is a service to be installed in a MasterSteward. It satisfies query requests from the presentation layer (ControlCenterView) for a particular field. The query can be for a particular field for all applications, all the instances of a given application, or from an individual application. It forwards the request to the appropriate application(s) depending on the nature of the request. After it has obtained the data necessary to satisfy the request, it returns the data to the requestor.

MS_HM_Update_Service 1406

This class is a service to be installed in a MasterSteward. It satisfies update requests from the presentation layer (ControlCenterView) for a particular field. The field to be updated can be a particular field for all applications, all the instances of a given application, or from an individual application. It forwards the request to the appropriate application(s) depending on the nature of the request. After the field has been updated successfully, it will return a status message to the requestor.

MS_HM_Invoke_Service 1404

This class is a service to be installed in a MasterSteward. It satisfies method invocation requests from the presentation layer (ControlCenterView). The service can invoke the method on all applications, all instances of a given application or on an individual application. It forwards the request to the appropriate application(s) depending on the nature of the request. A status message with a list of return values is returned to the requester.

MS_HM_TrapCatching Service 1402

This class is a service installed in a MasterSteward. It satisfies event-handling requests ("traps") from ApplicationStewards. An application sends its "traps" to its ApplicationSteward. The ApplicationSteward then sends the "trap" to the MasterSteward. The MasterSteward then asynchronously sends the "traps" to the presentation layer components (ControlCenterView). No response is returned as none is expected.

MS_HM_Registration 1408

This class is a service installed in a MasterSteward. It satisfies registration requests made by ApplicationStewards. The ApplicationSteward's contact information is registered with the MasterSteward to facilitate health management requests.

Figure 13:
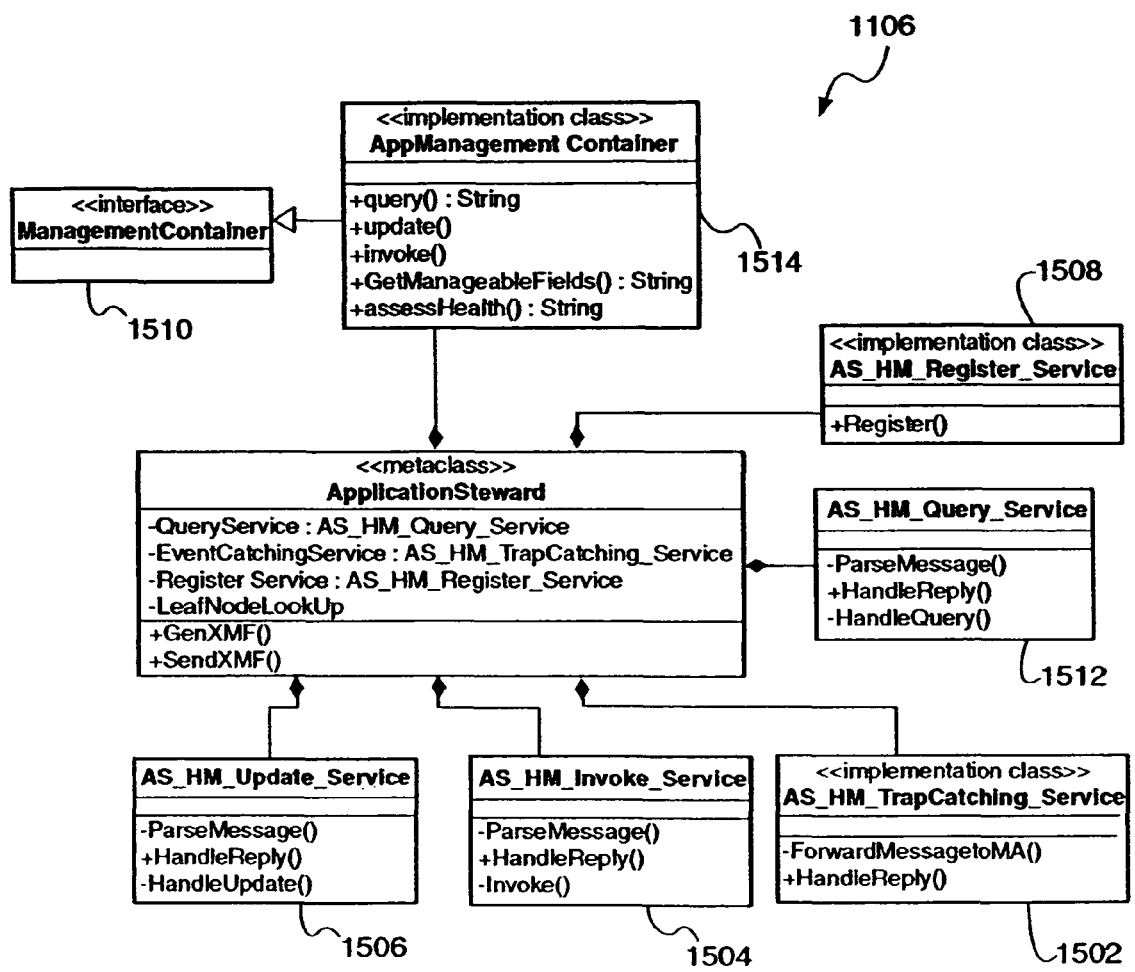
FIG. 13 shows a class diagram of an exemplary Application Steward of an OSS management system, in accordance with the principles of the present invention.

FIG. 13 shows a class diagram of an exemplary Application Steward of an OSS management system, in accordance with the principles of the present invention.

ApplicationSteward 1106

This class serves as an application's health management proxy. The ApplicationSteward has intimate knowledge of the application it represents. The configurable (manageable) components of an application are accessible through this proxy. Services use the ApplicationSteward to access these components to fulfill service requests. It contains a ManagementContainer, which can contain direct reference to manageable objects, assess the overall health of an application, or invoke functions. It also maintains knowledge of the agents comprising the application and their configurable/manageable components. It uses the configurable framework to access these components in fulfilling health management requests. The ApplicationSteward also generates health management events ("traps") on behalf of the components of the application.

AS_HM_QueryOverallHealth_Service

This class is a service installed in an ApplicationSteward. It satisfies query requests from the presentation layer (ControlCenterView) for the overall health of an application instance the ApplicationSteward represents. The method invokes the assessHealth (Health Status hs) method of the implementation class of ManagementContainer interface. This implementation class will have its disposal the resources necessary to assess the overall health of the application. After it has obtained the data necessary to satisfy the request, it populates the HealthStatus object, which returns the data to the requestor.

AS_HM_Query_Service 1512

This class is a service installed in an ApplicationSteward. It satisfies query requests from the MasterSteward for a particular field. The ApplicationSteward is used to access the appropriate component and obtain its value. The value is then returned to the MasterSteward.

AS_HM_Update_Service 1506

This class is a service installed in an ApplicationSteward. It satisfies update requests from the MasterSteward for a particular field. The ApplicationSteward is used to access the appropriate component and update its value. After the field has been updated successfully, it will return a status message to the requestor.

AS_HM_Invoke_Service

This class is a service installed in an ApplicationSteward. It satisfies method invocation requests from the MasterSteward. A command object is created based on the information contained in the invocation request. This object is passed to the invoke method of the ManagementContainer. A status message with a list of return values is returned to the MasterSteward.

AS_HM_TrapCatching Service

This class is a service installed in an ApplicationSteward. It satisfies event-handling requests ("traps") from the components of an application. An application's components send their "traps" to this service. The event-handling requests are forwarded to the MasterSteward's MS_HM_TrapCatching Service. No response is returned as none is expected.

AS_HM_Registration 1508

This class is a service installed in an ApplicationSteward. It satisfies registration requests made by the agents of an application. Agents register themselves with an ApplicationSteward as they do the broker's of the Voyager platform. The ApplicationSteward is then able to communicate with the agent when fulfilling health management service requests.

View_HM_TrapCatching Service 1502

This class is a service installed in presentation layer agents. It satisfies event-handling requests ("traps") from the MasterSteward. This service will parse the information contained in the "trap" and process it accordingly at the presentation layer.

ManagementContainer 1514

Implementation classes of this interface are members of an ApplicationSteward. It serves two roles. The first is to provide a container for applications to place direct references to configurable/manageable objects. The ApplicationSteward's services can use these references to satisfy requests. The ManagementContainer also contains the logic necessary to invoke methods available to the ManagementContainer. These could be member methods of the ManagementContainer itself, or they could be methods of objects housed within the ManagementContainer. The ManagementContainer also contains the logic for assessing the health of the application the ApplicationSteward represents. This logic should be unique to each application, but default behavior of checking for null values and agent existence will be provided.

HealthStatus

This class is an abstraction of the information required to accurately provide the health of an application. This object will be passed to an ApplicationSteward's ManagementContainer's assessHealth (HealthStatus hs) method. The method must assess the health of the application and populate the object accordingly. The ApplicationSteward then converts the HealthStatus object into the appropriate message (Usher) to fulfill the health management request.

Command

This class is an abstraction of a method invocation request. It is created when a vocation request arrives at AS_HM_Invoke_Service. The service parses the command and any parameters from the request, creates a command object containing these values, and then passes the command object to the ManagementContainer's invoke (Command cmd) method. Any response is loaded back into the command object.

Statistics Management Classes

Figure 14:
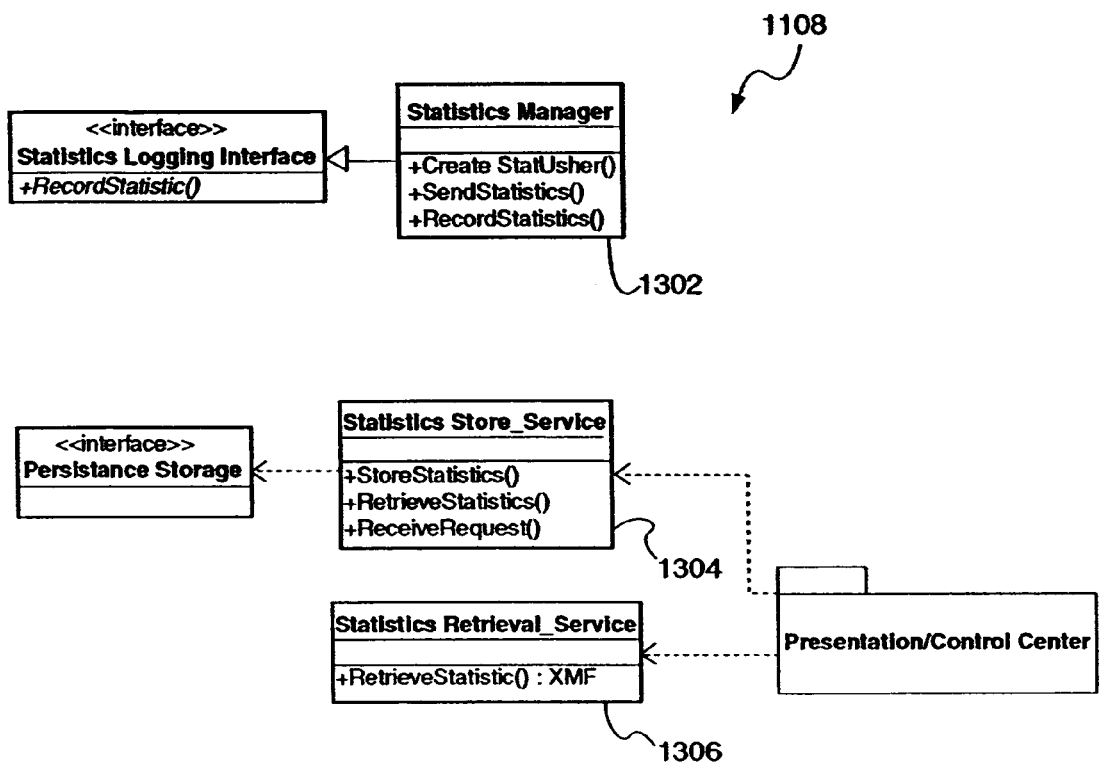
FIG. 14 shows a class diagram of an exemplary statistics manager of an OSS management system, in accordance with the principles of the present invention.

FIG. 14 shows a class diagram of an exemplary statistics manager of an OSS management system, in accordance with the principles of the present invention.

StatisticsManager 1302

This class provides applications with an abstraction of submitting statistics to the OSS framework 100 for persistent storage. It hides to complexity of sending statistics messages from the application developer.

StatisticsStorageService 1304

This class receives requests from applications or components to store statistics persistently. No response is returned as none is expected.

StatisticsRetrievalService 1306

This class retrieves statistics data based on the query parameters contained in the request. The resulting data is encoded in an XMF message and parsed by the requestor.

Control Center Classes

Figure 15:
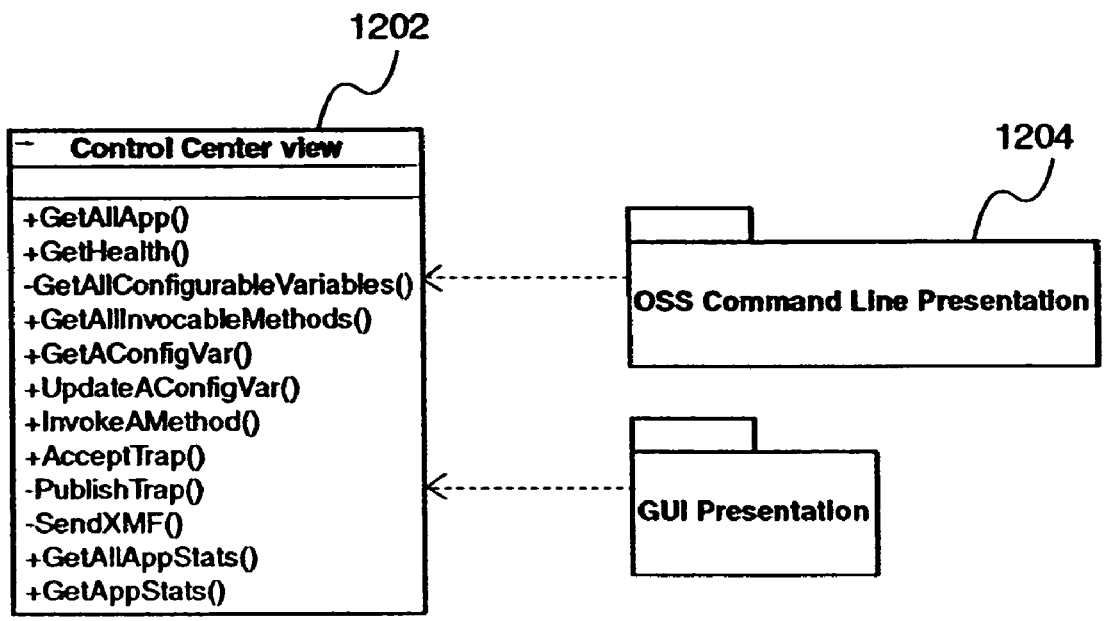
FIG. 15 shows a class diagram of an exemplary control center of an OSS management system, in accordance with the principles of the present invention.

FIG. 15 shows a class diagram of an exemplary control center of an OSS management system, in accordance with the principles of the present invention.

ControlCenterView

This class provides a view of the OSS framework 100 for presentation layer applications. It provides methods to query configurable/manageable fields and to update such fields, to invoke methods of an application that it has chosen to expose and to assess the overall health of applications. It also provides methods to view performance metrics history and logging information. Based on the parameters passed, the methods can request this information for all applications, all instances of a particular application type, or for an individual application instance.

OssCommandLineTool

This class provides the command-line interface. It houses a ControlCenterView object and processes requests depending on command-line arguments. Commands will be available to support all the functionality of the ControlCenterView.

ServiceProvider

Implementation classes of this interface are able to handle trap events forwarded to them by the View_HM_TrapCatching_Service. The implementation class contains references to objects that can process the "trap", such as display the message and trigger a health status update.

Figure 16:
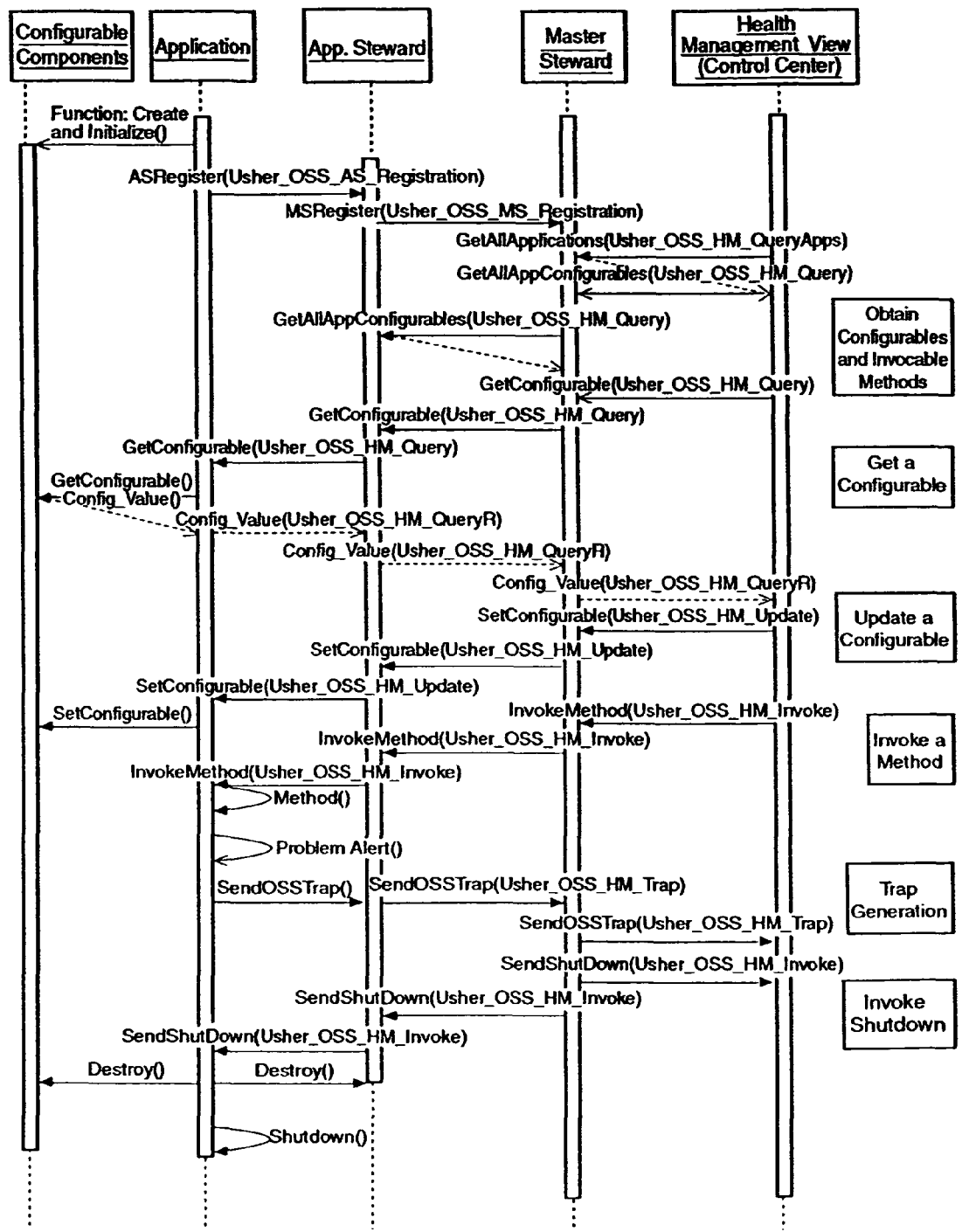
FIG. 16 shows a sequence diagram of an exemplary Health Manager of an OSS management system, in accordance with the principles of the present invention.

FIG. 16 shows a sequence diagram of an exemplary Health Manager of an OSS management system, in accordance with the principles of the present invention.

Figure 17:
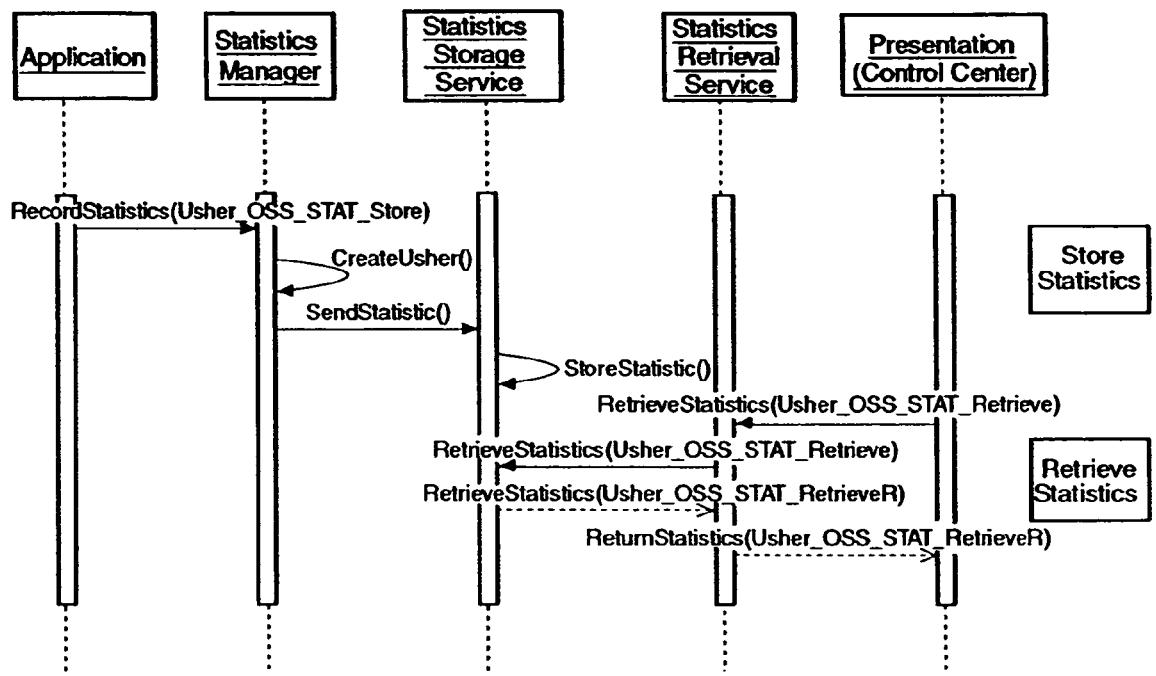
FIG. 17 shows a sequence diagram of an exemplary Statistics Manager of an OSS management system, in accordance with the principles of the present invention.

FIG. 17 shows a sequence diagram of an exemplary Statistics Manager of an OSS management system, in accordance with the principles of the present invention.

Figure 18:
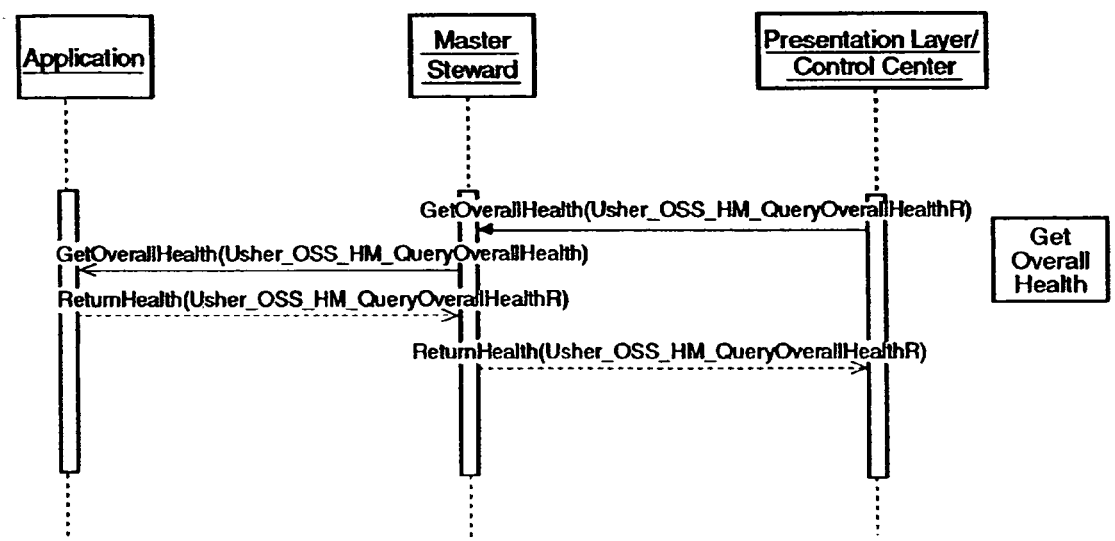
FIG. 18 shows a sequence diagram of an exemplary Overall Health manager of an OSS management system, in accordance with the principles of the present invention.

FIG. 18 shows a sequence diagram of an exemplary Overall Health manager of an OSS management system, in accordance with the principles of the present invention.

The OSS framework 100 is extensible. It effectively routes OSS requests to the proper application instance. Any OSS related task could be developed and plugged into the existing OSS framework 100 with no change at all to the core code base. Additional features can be added without even rebuilding any of the existing classes. Furthermore, the ApplicationSteward embedded in the application space is able to send requests into the Voyager platform to take advantages of any of the non-OSS services running.

Any company's applications or devices (given a driver compliant with the OSS framework 100) can take advantage of the OSS framework 100. Enterprise, web, legacy and hardware can be managed through the same interface. Furthermore, the presentation layer interface to the OSS framework 100 is encapsulated in a single object that can be used in custom user interfaces for any deployment. The OSS framework 100 is also relatively language agnostic. C++ and Java components can be managed through the same infrastructure.

They are presented seamlessly as a heterogeneous deployment takes on a homogeneous view.

While the invention has been described with reference to the exemplary embodiments thereof, those skilled in the art will be able to make various modifications to the described embodiments of the invention without departing from the true spirit and scope of the invention.

What is claimed is:

1. A method of providing a high level support framework, comprising:
    monitoring from a physical server a health of a plurality of client applications and a health of said plurality of client applications' distributed components, using a common monitoring protocol, said monitoring being independent of a programming technology of said plurality of client applications and respective distributed components;
    assessing said health of said plurality of client applications and said respective distributed components; and
    associating said health of said plurality of client applications and said respective distributed components as belonging to a single application node.

2. The method of providing a high level support framework according to claim 1, wherein:
    a first of said plurality of client applications is C++ language based; and
    a second of said plurality of client applications is Java language based.

3. The method of providing a high level support framework according to claim 1, wherein:
    a first of said plurality of client applications utilizes a Simple Network Management Protocol (SNMP) management service.

4. The method of providing a high level support framework according to claim 1, wherein:
    a first of said plurality of client applications utilizes a Java Management Extensions (JMX) management service.

5. The method of providing a high level support framework according to claim 1, wherein:
    a first of said plurality of client applications utilizes a Transaction Language 1 (TL1) management service.

6. The method of providing a high level support framework according to claim 1, wherein:
    a first of said plurality of client applications utilizes a Simple Network Management Protocol (SNMP) management service;
    a second of said plurality of client applications utilize a Java Management Extensions (JMX) management service; and
    a third of said plurality of client applications utilize a Transaction Language 1 (TL1) management service.

7. The method of providing a high level support framework according to claim 1, further comprising:
    maintaining fault management data relating to said plurality of client applications.

8. The method of providing a high level support framework according to claim 1, further comprising:
    maintaining performance measurement data relating to said plurality of client applications.

9. The method of providing a high level support framework according to claim 1, further comprising:
    supporting any of an RDBM, a flat file, and an XML document type in a persistent storage mechanism accessed by said high level support framework.

* * * * *